(12) United States Patent
Yoshino et al.

(10) Patent No.: US 10,930,993 B2
(45) Date of Patent: Feb. 23, 2021

(54) ANTENNA DEVICE AND RECEPTION DEVICE

(71) Applicant: Sony Semiconductor Solutions Corporation, Kanagawa (JP)

(72) Inventors: Yoshitaka Yoshino, Tokyo (JP); Tomomichi Murakami, Tokyo (JP); Toshiyuki Sudo, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/477,977

(22) PCT Filed: Oct. 24, 2017

(86) PCT No.: PCT/JP2017/038323
§ 371 (c)(1),
(2) Date: Jul. 15, 2019

(87) PCT Pub. No.: WO2018/135059
PCT Pub. Date: Jul. 26, 2018

(65) Prior Publication Data
US 2019/0348739 A1    Nov. 14, 2019

(30) Foreign Application Priority Data

Jan. 20, 2017   (JP) .............................. JP2017-008541

(51) Int. Cl.
*H01Q 9/28* (2006.01)
*H01P 5/10* (2006.01)
(Continued)

(52) U.S. Cl.
CPC ................. *H01P 5/10* (2013.01); *H01Q 1/50* (2013.01); *H01Q 9/16* (2013.01); *H04N 21/41* (2013.01); *H04N 21/6112* (2013.01)

(58) Field of Classification Search
CPC ... H01P 5/10; H01Q 1/50; H01Q 9/16; H01Q 9/28; H01Q 9/285; H01Q 9/065;
(Continued)

(56) References Cited

U.S. PATENT DOCUMENTS 5,914,692 A * 6/1999 Bowers .................... H01Q 7/00
340/572.7
6,891,515 B1   5/2005 Langley et al.
(Continued)

FOREIGN PATENT DOCUMENTS

CN    2562384 Y    7/2003
CN    1136629 C    1/2004
(Continued)

OTHER PUBLICATIONS

International Search Report and Written Opinion and English translation thereof dated Dec. 19, 2017 in connection with International Application No. PCT/JP2017/038327.
(Continued)

*Primary Examiner* — Awat M Salih
(74) *Attorney, Agent, or Firm* — Wolf, Greenfield & Sacks, P.C.

(57) ABSTRACT

An antenna device includes: a balanced transmission line to which an unbalanced transmission line is connected at one end; and antenna elements respectively provided on both sides of the balanced transmission line, in which at least one of the antenna elements, in a case where a first point and a second point are set, the first point being separated from a position on one end side of the balanced transmission line in a direction substantially orthogonal to the balanced transmission line, the second point being separated from a position on another end side of the balanced transmission line in a direction substantially orthogonal to the balanced transmission line, has a shape including the second point and
(Continued)

an oblique line or side connecting the other end side of the balanced transmission line with the first point, the other end side of the balanced transmission line is connected to a vertex portion of the antenna element, a linear element is provided extending from a position of the first point of the antenna element toward the one end side of the balanced transmission line, and the antenna element and the linear element include a conductor.

11 Claims, 26 Drawing Sheets

(51) Int. Cl.
    *H01Q 1/50* (2006.01)
    *H01Q 9/16* (2006.01)
    *H04N 21/41* (2011.01)
    *H04N 21/61* (2011.01)

(58) Field of Classification Search
    CPC  H01Q 9/265; H01Q 9/44; H01Q 5/48; H01Q 13/04; H01Q 19/108; H01Q 19/13; H01Q 21/062; H04N 21/41; H04N 21/6112
    See application file for complete search history.

(56) References Cited

U.S. PATENT DOCUMENTS

| | | | |
|---|---|---|---|
| 7,046,976 B2 * | 5/2006 | Le Naour | H03M 1/185 |
| | | | 348/E5.115 |
| 9,118,096 B2 * | 8/2015 | Henderson | H01P 3/081 |
| 2005/0116869 A1 | 6/2005 | Siegler et al. | |
| 2006/0033664 A1 | 2/2006 | Soler Castany et al. | |
| 2006/0109175 A1 | 5/2006 | Yeh | |
| 2006/0164316 A1 * | 7/2006 | Schillmeier | H01Q 23/00 |
| | | | 343/795 |
| 2006/0256018 A1 | 11/2006 | Soler Castany et al. | |
| 2007/0120742 A1 | 5/2007 | Soler Castany et al. | |
| 2009/0085810 A1 | 4/2009 | Soler Castany et al. | |
| 2010/0289703 A1 | 11/2010 | Huang | |
| 2010/0328185 A1 | 12/2010 | Soler Castany et al. | |
| 2012/0062433 A1 * | 3/2012 | Balanis | H01Q 1/48 |
| | | | 343/720 |
| 2012/0212380 A1 | 8/2012 | Theobold et al. | |
| 2012/0249380 A1 | 10/2012 | Solar Castany et al. | |
| 2013/0150711 A1 | 6/2013 | Theobold et al. | |
| 2015/0194736 A1 * | 7/2015 | Diukman | H01Q 21/0006 |
| | | | 343/818 |
| 2015/0303575 A1 | 10/2015 | Soler Castany et al. | |
| 2016/0156097 A1 | 6/2016 | Kobayashi et al. | |
| 2018/0191070 A1 * | 7/2018 | Suzuki | H01Q 13/16 |
| 2019/0363420 A1 | 11/2019 | Yoshino et al. | |

FOREIGN PATENT DOCUMENTS

| | | |
|---|---|---|
| CN | 101325284 A | 12/2008 |
| CN | 101924275 A | 12/2010 |
| CN | 202084638 U | 12/2011 |
| CN | 103187625 A | 7/2013 |
| CN | 104966897 A | 10/2015 |
| CN | 105870616 A | 8/2016 |
| JP | 08-008628 | 1/1996 |
| JP | 08-0088628 A | 1/1996 |
| JP | 2001-508260 A | 6/2001 |
| JP | 2006-505973 A | 2/2006 |
| JP | 2010-503306 A | 1/2010 |
| JP | 2012-049852 A | 3/2012 |
| JP | 2014-507910 A | 3/2014 |
| JP | 2015-211425 A | 11/2015 |
| JP | 2016-111384 A | 6/2016 |
| WO | WO 98/031107 A1 | 7/1998 |
| WO | WO 2000/077884 A1 | 12/2000 |
| WO | WO 2004/042868 A1 | 5/2004 |
| WO | WO 2008/029321 A1 | 3/2008 |
| WO | WO 2012/115937 A1 | 8/2012 |
| WO | WO 2013/086346 A1 | 6/2013 |
| WO | WO 2014/118784 A1 | 8/2014 |

OTHER PUBLICATIONS

International Preliminary Report on Patentability and English translation thereof dated Aug. 1, 2019 in connection with International Application No. PCT/JP2017/038327.
International Written Opinion and English translation thereof dated Dec. 19, 2017 in connection with International Application No. PCT/JP2017/038323.
International Preliminary Report on Patentability and English translation thereof dated Aug. 1, 2019 in connection with International Application No. PCT/JP2017/038323.
International Search Report and English translation thereof dated Dec. 19, 2017 in connection with International Application No. PCT/JP2017/0438323.
Chinese Office Action dated Jun. 12, 2020 in connection with Chinese Application No. 201780083369.5, and English translation thereof.
Chinese Office Action dated Jun. 23, 2020 in connection with Chinese Application No. 201780084131.4, and English translation thereof.

* cited by examiner

A

B

| | Vertical polarization | | | | | | | |
|---|---|---|---|---|---|---|---|---|
| Freq[MHz] | 188.5 | 192.5 | 194.5 | 198 | 204 | 210 | 216 | 222 |
| Peak[dBd] | −19.50 | −17.81 | −17.41 | −16.46 | −15.27 | −14.97 | −14.66 | −14.47 |

| | Horizontal polarization | | | | | | | |
|---|---|---|---|---|---|---|---|---|
| Freq[MHz] | 188.5 | 192.5 | 194.5 | 198 | 204 | 210 | 216 | 222 |
| Peak[dBd] | −1.64 | −0.89 | −0.81 | −0.50 | 0.17 | −0.67 | −1.46 | −2.23 |

ANTENNA DEVICE AND RECEPTION DEVICE

CROSS-REFERENCE TO RELATED APPLICATIONS

This application claims the benefit under 35 U.S.C. § 371 as a U.S. National Stage Entry of International Application No. PCT/JP2017/038323, filed in the Japanese Patent Office as a Receiving Office on Oct. 24, 2017, which claims priority to Japanese Patent Application Number JP2017-008541, filed in the Japanese Patent Office on Jan. 20, 2017, each of which is hereby incorporated by reference in its entirety.

TECHNICAL FIELD

The present technology relates to an antenna device and a reception device applied to an indoor antenna that receives digital terrestrial television broadcasting, for example.

BACKGROUND ART

As a function necessary for a digital terrestrial television antenna, it is necessary that a high antenna gain can be obtained in a wide frequency band (very high frequency (VHF) band, ultra high frequency (UHF) band) in which television broadcasting is performed. In other words, coexistence is required of broadband performance and antenna performance. In particular, the band for digital terrestrial television in the UHF band is 470 MHz to 800 MHz, and the reception fractional bandwidth exceeds 40% or more, so that a very wide band antenna is required. Thus, coexistence has been difficult of broadband performance and antenna performance.

Moreover, in a case where it is intended to receive television broadcasting in the VHF band in addition to the UHF band, the antenna size also becomes very large. For example, in the case of a frequency of 200 MHz in the high band of the VHF band, a length of $\lambda/2$ is necessary for reception, and the length is about 75 cm, which cannot be arranged in a room. Moreover, the antenna has to cope with both the high band of the VHF band and the UHF band, so that the antenna design has been difficult.

As a reception antenna for digital terrestrial television for indoor use, one using a bow-tie antenna has been practicalized. The bow-tie antenna has a configuration in which radiation elements of a dipole antenna are formed in a plate-like shape of an isosceles triangle. Moreover, Patent Document 1 below describes that a multiband antenna includes an antenna device including a bow-tie antenna element, a monopole antenna element, and a ground conductor plate.

CITATION LIST

Patent Document

Patent Document 1: Japanese Patent Application Laid-Open No. 2015-211425

SUMMARY OF THE INVENTION

Problems to be Solved by the Invention

The one described in Patent Document 1 is a combination of a bow-tie antenna element and a monopole antenna element, which has been insufficient in terms of antenna characteristics and downsizing. Furthermore, in the example of the balanced antenna described in Patent Document 1, a balun is used in a case where a coaxial cable is connected. However, since the balun itself is relatively expensive, there has been a problem that the cost of the antenna device increases.

Thus, an object of the present technology is to provide an antenna device and a reception device that can cope with wide frequencies, obtain a high antenna gain, and have low cost.

Solutions to Problems

The present technology is an antenna device made to perform impedance matching and phase adjustment by connecting an unbalanced circuit to a power feeding point via a balanced circuit of a certain length.

Furthermore, the present technology is an antenna device including:

a balanced transmission line to which an unbalanced transmission line is connected at one end; and antenna elements respectively provided on both sides of the balanced transmission line, in which at least one of the antenna elements, in a case where a first point and a second point are set, the first point being separated from a position on one end side of the balanced transmission line in a direction substantially orthogonal to the balanced transmission line, the second point being separated from a position on another end side of the balanced transmission line in a direction substantially orthogonal to the balanced transmission line, has a shape including the second point and an oblique line or side connecting the other end side of the balanced transmission line with the first point, the other end side of the balanced transmission line is connected to a vertex portion of the antenna element, a linear element is provided extending from a position of the first point of the antenna element toward the one end side of the balanced transmission line, and the antenna element and the linear element include a conductor.

Moreover, the present technology is a reception device that uses such an antenna device.

Effects of the Invention

According to at least one embodiment, the present technology can eliminate the need for the balun in a case where the unbalanced circuit and the antenna device are connected with each other. Furthermore, the antenna device according to the present technology can be downsized, and has broadband. Note that, the effects described here are not necessarily limited, and may be any of effects described in the present disclosure or an effect different from the effects.

MODE FOR CARRYING OUT THE INVENTION

Figure 1:
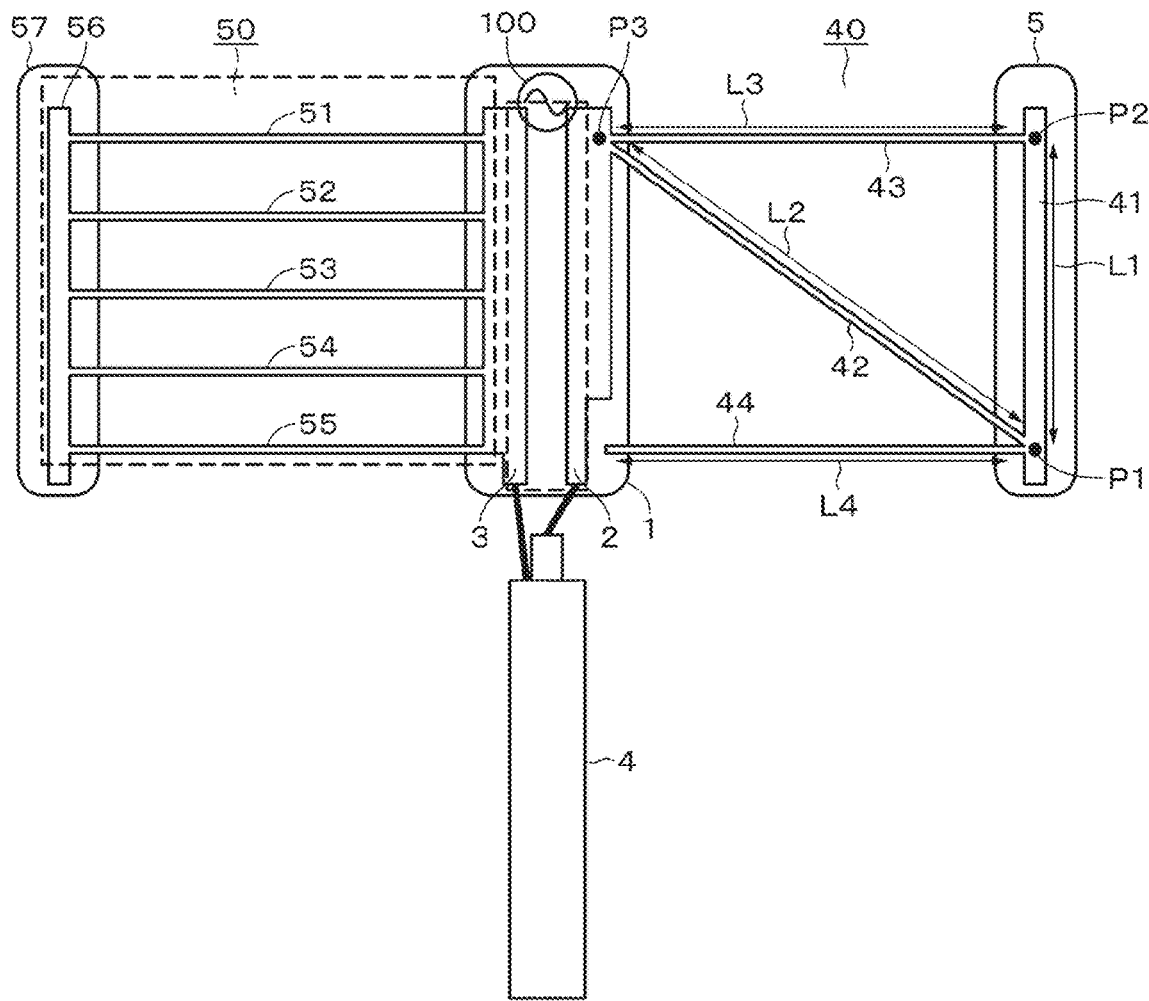
FIG. 1 is a schematic diagram of an antenna device according to a first embodiment of the present technology.

Embodiments described below are suitable specific examples of the present technology, and have various technically preferable limitations. However, the scope of the present technology is not limited to these embodiments unless specifically described in the following description to the effect of limiting the present technology.

Note that, the description of the present technology will be made in the following order.
1. First Embodiment
2. Second Embodiment
3. Third Embodiment
4. Fourth Embodiment
5. Fifth Embodiment
6. Sixth Embodiment
7. Seventh Embodiment
8. Modification
9. Application example 1. First Embodiment A first embodiment of the present technology will be described with reference to FIG. 1. Two lines 2 and 3 are provided in parallel with each other as a balanced transmission line on an insulating substrate 1. One end of the line 2 is connected to a central conductor (core wire) of a coaxial cable 4, and one end of the line 3 is connected to an outer conductor (braided copper wire) of the coaxial cable 4. Although not illustrated, the coaxial cable 4 is connected to a reception device, for example, a tuner of a television reception device.

Antenna elements 40 and 50 are respectively provided on both sides of the balanced transmission line. The antenna element 40 is connected to the other end of the line 2, and the antenna element 50 is connected to the other end of the line 3. A first point P1 and a second point P2 are set, the first point P1 being separated by a predetermined distance from a position of one end of the balanced transmission line (lines 2 and 3) in a direction substantially orthogonal to the balanced transmission line, the second point P2 being separated by a predetermined distance from a position of the other end of the balanced transmission line in a direction substantially orthogonal to the balanced transmission line. A point P3 is set at a position of the other end of the line 2 of the balanced transmission line.

A wire or rod (hereinafter simply referred to as a linear element) 41 is provided on a straight line connecting the points P1 and P2 with each other. The linear element 41 is provided on an insulating substrate 5 in parallel with the balanced transmission line (lines 2 and 3). Furthermore, a linear element 42 is provided on an oblique line connecting the first point P1 with the third point P3. A linear element 43 is provided on a line connecting the second point P2 with the third point P3.

Thus, by connecting ends of the linear elements 41 and 42 with each other, ends of the linear elements 41 and 43 with each other, and ends of the linear elements 42 and 43 with each other, a triangular (right triangular shape) antenna element is formed. In other words, a triangular antenna element is formed that is raised from the oblique line connecting the first point P1 with the third point P3 toward the second point P2. Furthermore, a vertex portion formed by the linear elements 42 and 43 is connected, for example, by soldering with the other end of the line 2 of the balanced transmission line. Note that, in the present description, "triangular" is used as a meaning including shapes other than a triangle.

Moreover, a linear element 44 is provided that is connected to the linear element 41 at a position of the first point P1 of the triangular antenna element and extends (or is folded back) to one end of the line 2 of the balanced transmission line. An extended end of the linear element 44 is fixed on the insulating substrate 1. However, one end on the line 2 side of the linear element 44 is not connected to the line 2. As described above, since the linear element 44 is in a state of being a folded element independent of the triangular portion, it becomes possible to cope with a frequency corresponding to a length L4 of the linear element 44. Impedance matching is performed by the balanced transmission line and the linear element 44.

Lengths of the linear elements 41, 42, 43, and 44 are denoted as L1, L2, L3, and L4, respectively. The length L1 is set to be substantially equal to the length of the balanced transmission line, and furthermore, (L3=L4) is set. These lengths are set depending on a reception frequency. The linear elements 41 to 44 include a conductive substance such as copper, silver, iron, or aluminum. Moreover, the insulating substrates 1 and 5 each are a printed circuit board of glass epoxy, ceramic, or the like, a flexible printed circuit (FPC), glass, or plastic such as molding resin. Moreover, the whole of the insulating substrates 1 and 5 may be covered with a case of resin or the like.

The antenna element 50 will be described that is on the opposite side of the balanced transmission line. Five linear elements 51, 52, 53, 54 and 55 are provided extending in a direction orthogonal to the line 3 from respective positions substantially equally dividing the line 3 of the balanced transmission line. Ends of these linear elements 51 to 55 are connected to a linear element 56. The linear element 56 is provided on an insulating substrate 57 in parallel with the line 3. The material of the linear elements 51 to 56 and the material of the insulating substrate 57 are respectively similar to the material of the linear elements 41 to 44 and the material of the insulating substrates 1 and 5 described above.

By arranging the five linear elements 51 to 55 in parallel with each other, the linear elements are capacitively coupled in a high frequency band, and various currents can be caused to flow, and the elements can operate similarly to a surface. It is possible to expand a band that can be received as an antenna device.

For example, the insulating substrates 1, 5, and 57 include printed circuit boards, and the lines 2 and 3, the linear element 41, and the linear element 56 are formed as a printed wiring pattern on the respective substrates. Since the dielectric constant changes when the lines and elements are formed on the substrate, an antenna shape can be formed small by adjusting the dielectric constant. Hereinafter, in the present description, a rate at which the length of the linear element is shortened in consideration of the dielectric constant and the like is referred to as a wavelength shortening rate.

Figure 2:
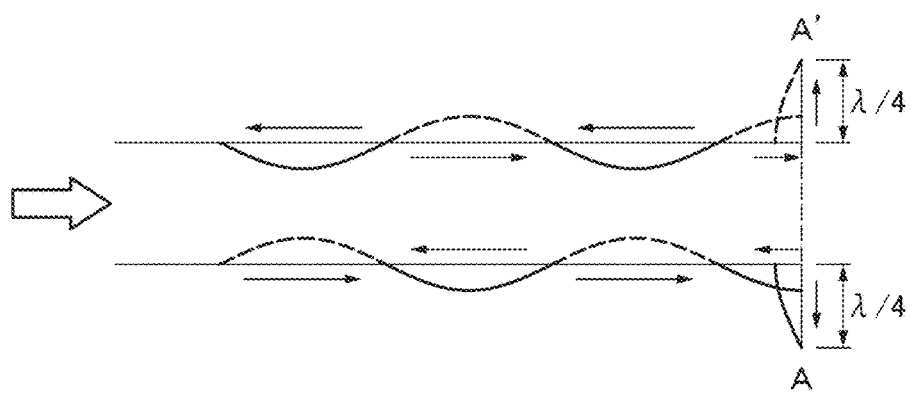
FIG. 2 is a schematic diagram used for describing the first embodiment.

The antenna element 50 functions as a ground conductor as indicated by a broken line, with respect to the antenna element 40. In the first embodiment of the present technology, a power feeding point 100 for the antenna device is at the other end side of the balanced transmission line (lines 2 and 3), and the balanced transmission line is appropriately set, whereby an unbalanced transmission line (coaxial cable 4) can be connected to a balanced load (antenna device) without using a balun. As illustrated in FIG. 2, in an open termination line, when an upper conductor is bent upward and a lower conductor is bent downward at a position separated by $\lambda/4$ from an open end (A-A'), directions of currents are the same as each other at a bent portion. Thus, cancellation of radiation does not occur, and an electromagnetic wave is radiated to a space. In a case where the length of the bent portion is set to a half wavelength ($\lambda/2$), the input impedance becomes a pure resistance by resonance, so that matching can be easily performed. In other words, broadband can be achieved by adjusting the phase with intervention of the balanced transmission line.

To achieve such antenna performance, it is necessary to set the characteristic impedance and length of the balanced transmission line. The value is set as follows.

In view of the antenna reception frequency band, the impedance of the balanced load (antenna device), and the impedance of the unbalanced transmission line to be connected, a combination is set of structures of the lines (conductors) 2 and 3 of the balanced transmission line, a distance between the conductors, and a dielectric constant of the insulator, whereby the characteristic impedance of the balanced transmission line is determined, and the length is set in consideration of the characteristic impedance.

Example 1

According to the first embodiment of the present technology, broadband can be achieved. Specifically, to receive the high band (200 MHz band) of the VHF band of television broadcasting, the length of (L3+L1+L4) or (L2+L4) is set to about ($\frac{1}{4}$) of a wavelength ($\lambda$1) of the frequency band, for example, about 38 cm. Furthermore, to receive the band (470 Hz to 800 MHz) of digital terrestrial television broadcasting in the UHF band, the length of L3 or L2 is set to about ($\frac{1}{4}$) of a wavelength ($\lambda$2) of the frequency band, for example, about 16 cm. These lengths L1 to L4 are values including the wavelength shortening rate.

As an example, (L1=9 cm) (L3=17 cm) (L4=17 cm) are set. The total length is 43 cm. Furthermore, the antenna element 50 is made to have an outer shape equivalent to the antenna element 40. As an example, the length of each of the linear elements 51 to 55 is set to 17 cm, and the length of the linear element 56 is set to 9 cm.

Figure 3:
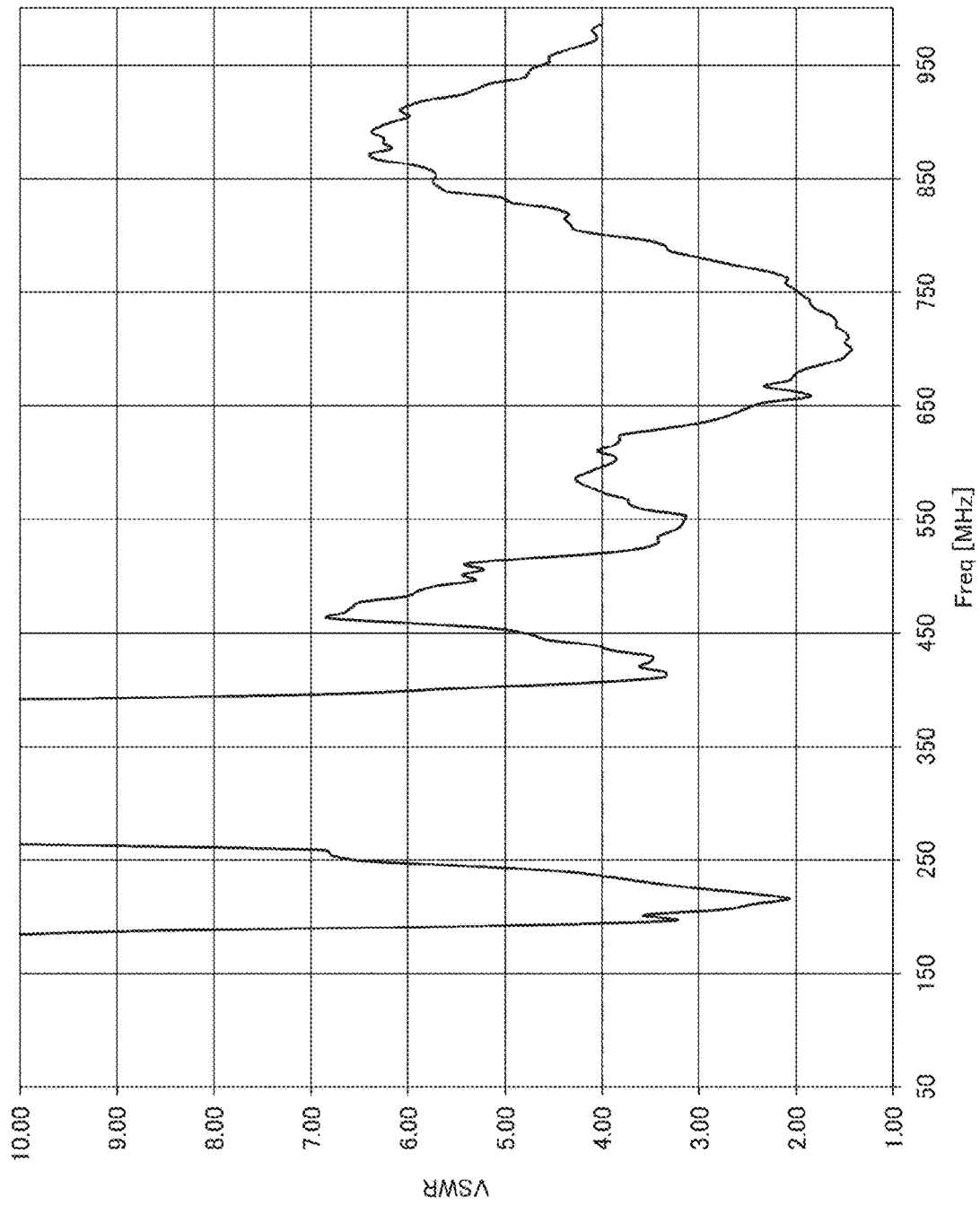
FIG. 3 is a graph illustrating a frequency characteristic of a VSWR of an example of the first embodiment obtained by simulation.

As a simulation result of Example 1, a voltage standing wave ratio (VSWR) is illustrated in FIG. 3. (VSWR=1) means perfect matching, the best state, and (VSWR=∞) means perfect reflection, the worst state. An influence by a coating material exists, and furthermore, an influence of coupling exists since the antenna element is folded and brought close to a connection point between the coaxial cable 4 and the balanced transmission line. Thus, although there is a portion different from reality, a form can be implemented close to a theoretical value, and both the high band of the VHF band and the UHF band can be received. However, strictly speaking, the wavelength shortening rate also differs depending on the material, so that the characteristics may change.

Figure 4:
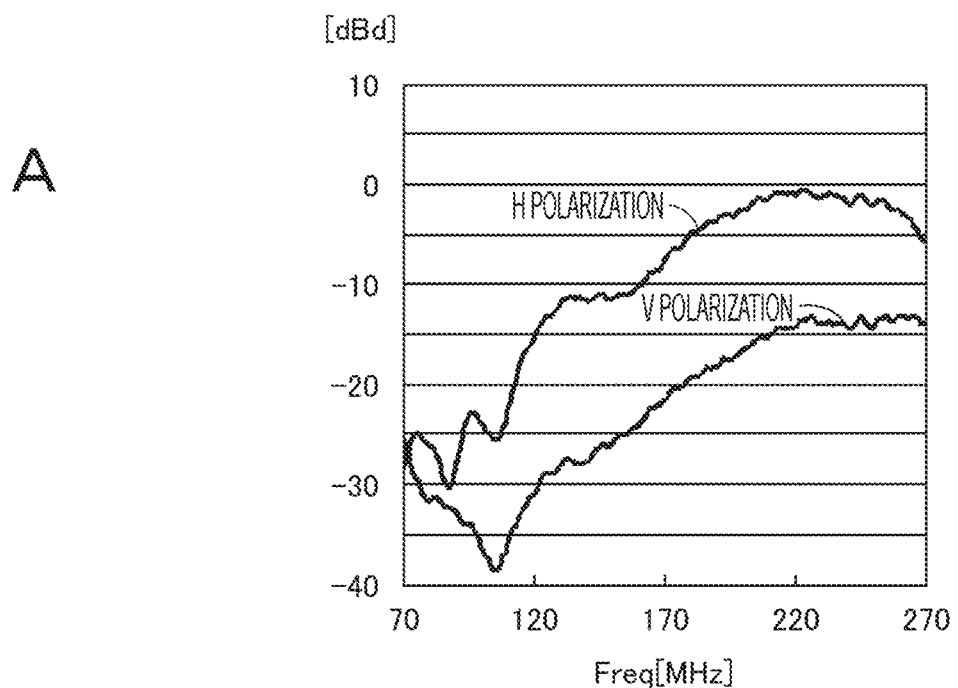
FIG. 4A is a graph illustrating frequency characteristics of gains in the VHF band of the example of the first embodiment obtained by simulation.
FIG. 4B illustrates tables indicating respective data of the gains.
Figure 5:
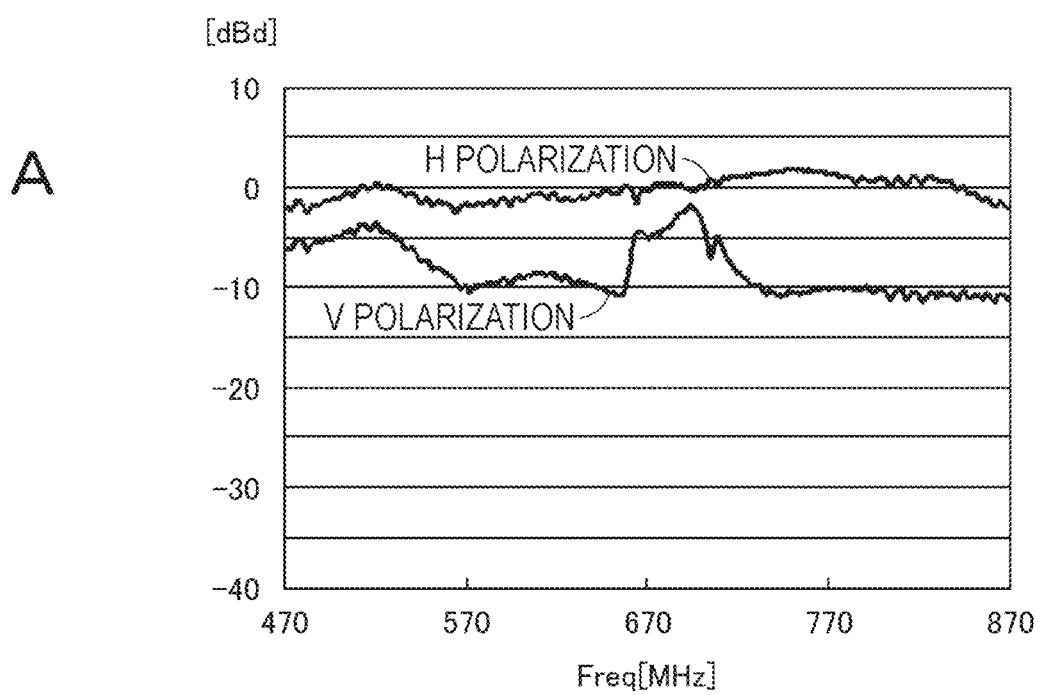
FIG. 5A is a graph illustrating frequency characteristics of gains in the UHF band of the example of the first embodiment obtained by simulation.
FIG. 5B illustrates tables indicating respective data of the gains.

FIG. 4 illustrates a graph and data of antenna gains in the high band of the VHF band of Example 1, and FIG. 5 illustrates a graph and data of antenna gains in the UHF band of Example 1. FIGS. 4A and 5A are graphs illustrating frequency characteristics of the gains, and FIGS. 4B and 5B indicate the data. The horizontal axis in FIGS. 4A and 5A indicates frequency (MHz), and the vertical axis indicates peak gain (dBd). A value in dBd is a value in comparison with a dipole antenna. There is a relationship of (dBd=2.15 dBi). A value in dBi is an antenna gain (absolute gain). In the graph, a line attached with "H polarization" illustrates frequency-gain characteristics at the time of horizontal polarization reception, and the line attached with "V polarization" illustrates frequency-gain characteristics at the time of vertical polarization reception. It can also be seen from FIGS. 4 and 5 that both the high band of the VHF band and the UHF band can be received.

2. Second Embodiment

Figure 6:
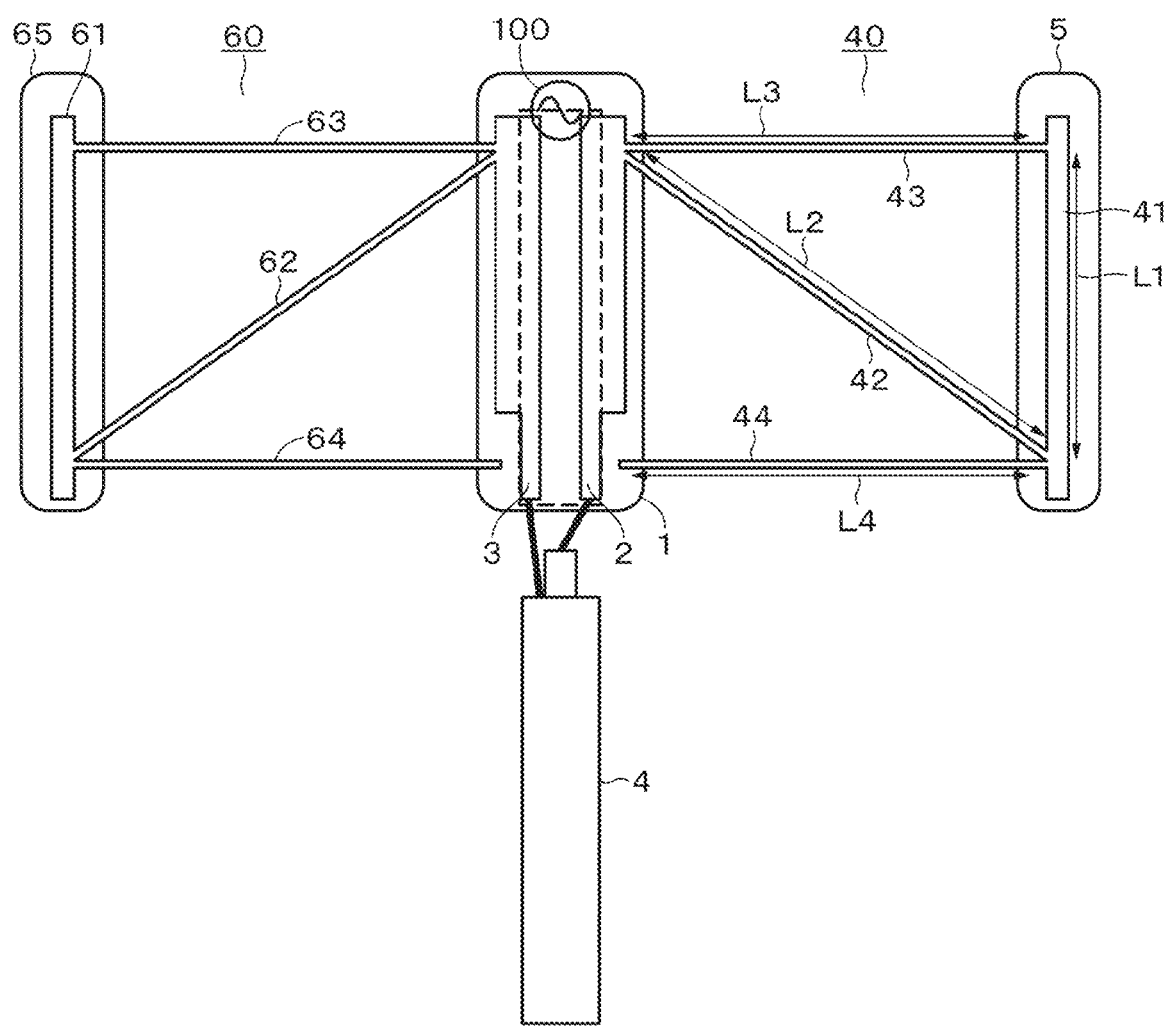
FIG. 6 is a schematic diagram of an antenna device according to a second embodiment of the present technology.

A second embodiment of the present technology will be described with reference to FIG. 6. Similarly to the first embodiment, two lines 2 and 3 are provided in parallel with each other as a balanced transmission line on an insulating substrate 1. One end of the line 2 is connected to a central conductor (core wire) of a coaxial cable 4, and one end of the line 3 is connected to an outer conductor (braided copper wire) of the coaxial cable 4. Although not illustrated, the coaxial cable 4 is connected to a reception device, for example, a tuner of a television reception device.

Antenna elements 40 and 60 are respectively provided on both sides of the balanced transmission line. The antenna element 40 is connected to the other end of the line 2 and the antenna element 60 is connected to the other end of the line 3. The antenna element 40 is made to have a configuration similar to that of the first embodiment described above. In other words, by connecting ends of the linear elements 41 and 42 with each other, ends of the linear elements 41 and 43 with each other, and ends of the linear elements 42 and 43 with each other, a triangular antenna element is formed.

Similarly, in the antenna element 60, by connecting ends of the linear elements 61 and 62 with each other, ends of the linear elements 61 and 63 with each other, and ends of the linear elements 62 and 63 with each other, a triangular antenna element is formed. A vertex portion formed by the ends of the linear elements 62 and 63 is connected to the other end of the line 3 of the balanced transmission line.

Moreover, a linear element 64 is provided that is connected to the linear element 61 of the triangular antenna element and extends (or is folded back) to one end of the line 3 of the balanced transmission line. An extended end of the linear element 64 is fixed on the insulating substrate 1. However, one end on the line 3 side of the linear element 64 is not connected to the line 3. Impedance matching is performed by the balanced transmission line and the linear element 64.

The lengths (L1, L2, L3, and L4) of the linear elements 41, 42, 43, and 44 are respectively set to be equal to the lengths of the linear elements 61, 62, 63, and 64. These lengths are set depending on a reception frequency, as described above. The linear elements 61 to 64 include a conductive substance such as copper, silver, iron, or aluminum. Moreover, the insulating substrate 65 is a printed circuit board of glass epoxy, ceramic, or the like, or a plate including a flexible printed circuit (FPC), glass, or a plastic such as molding resin.

The antenna element 60 forms a dipole antenna together with the antenna element 40. Furthermore, also in the second embodiment, a power feeding point 100 for the antenna device is at the other end side of the balanced transmission line (lines 2 and 3), and the length of the balanced transmission line is appropriately set, whereby an unbalanced transmission line (coaxial cable 4) can be connected to a balanced load (antenna device) without using a balun. By adjusting the phase with intervention of the balanced transmission line, broadband can be achieved.

Example 2

According to the second embodiment of the present technology, similarly to the first embodiment, by setting the length of each of the linear elements of the antenna element 60 to a value depending on the reception frequency, broadband can be achieved. Specifically, to receive the high band (200 MHz band) of the VHF band, the length of (L3+L1+L4) or (L2+L4) is set to about (¼) of a wavelength (λ1) of the frequency band, for example, about 38 cm. Furthermore, to receive the band (470 Hz to 800 MHz) of digital terrestrial television in the UHF band, the length of L3 or L2 is set to about (¼) of a wavelength (λ2) of the frequency band, for example, about 16 cm. These lengths L1 to L4 are values including the wavelength shortening rate. As an example, the lengths are set to be equal to those in Example 1.

Figure 7:
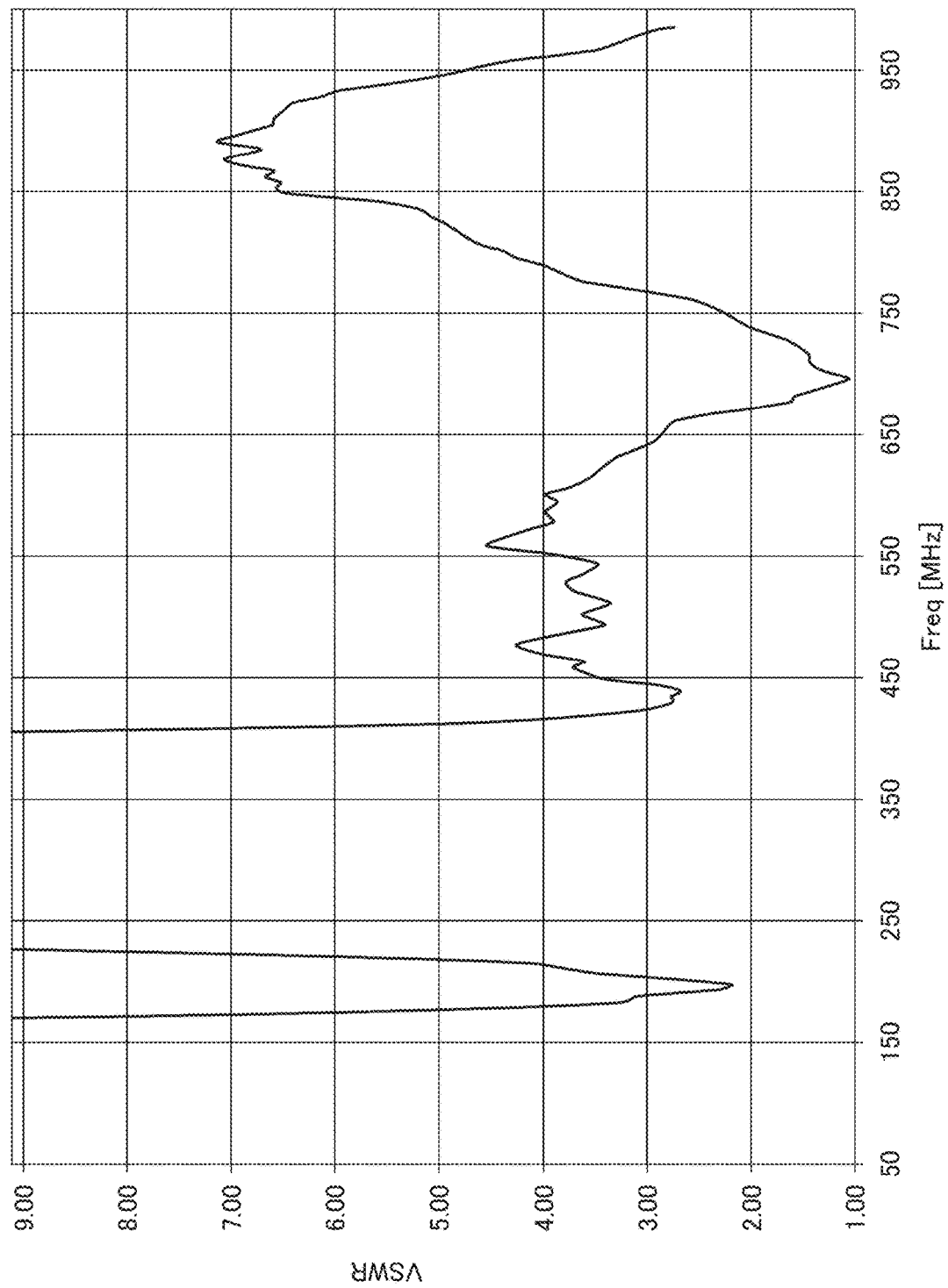
FIG. 7 is a graph illustrating a frequency characteristic of a VSWR of an example of the second embodiment obtained by simulation.

A simulation result (VSWR) of Example 2 is illustrated in FIG. 7. (VSWR=1) means perfect matching, the best state, and (VSWR=∞) means perfect reflection, the worst state. There is an influence by a coating material, and furthermore, there is an influence of coupling since the antenna element is folded and brought close to a connection point between the coaxial cable 4 and the balanced transmission line. Thus, although there is a portion different from reality, a form can be implemented close to a theoretical value, and both the high band of the VHF band and the UHF band can be received.

Figure 8:
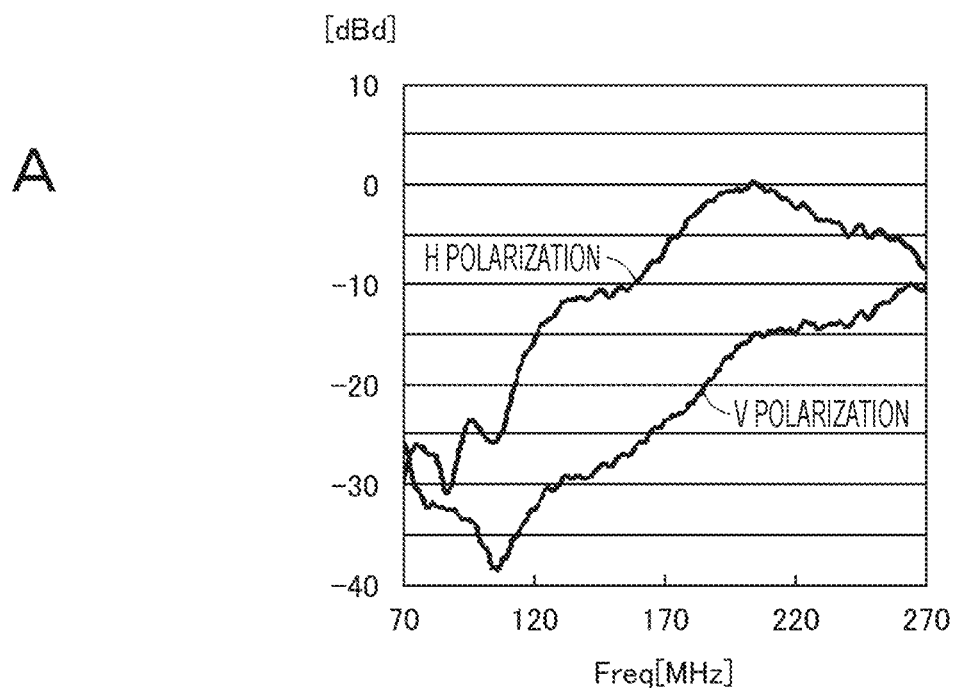
FIG. 8A is a graph illustrating frequency characteristics of gains in the VHF band of the example of the second embodiment obtained by simulation.
FIG. 8B illustrates tables indicating respective data of the gains.
Figure 9:
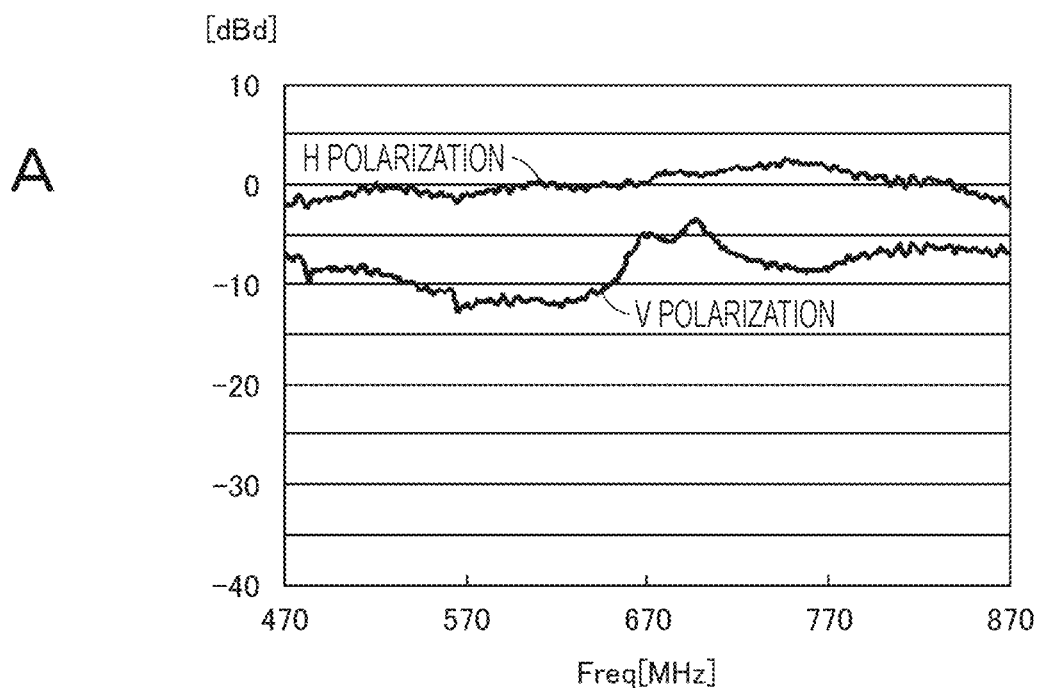
FIG. 9A is a graph illustrating frequency characteristics of gains in the UHF band of the example of the second embodiment obtained by simulation.
FIG. 9B illustrates tables indicating respective data of the gains.

FIG. 8 illustrates a graph and data of antenna gains in the high band of the VHF band of Example 2, and FIG. 9 illustrates a graph and data of antenna gains in the UHF band of Example 2. FIGS. 8A and 9A are graphs illustrating frequency characteristics of the gains, and FIGS. 8B and 9B indicate the data. The horizontal axis in FIGS. 8A and 9A indicates frequency (MHz), and the vertical axis indicates peak gain (dBd). A value in dBd is a value in comparison with a dipole antenna. It is set as (dBd=2.15 dBi). A value in dBi is an antenna gain (absolute gain). In the graph, a line attached with "H polarization" illustrates frequency-gain characteristics at the time of horizontal polarization reception, and the line attached with "V polarization" illustrates frequency-gain characteristics at the time of vertical polarization reception. It can also be seen from FIGS. 8 and 9 that both the high band of the VHF band and the UHF band can be received.

3. Third Embodiment

Figure 10:
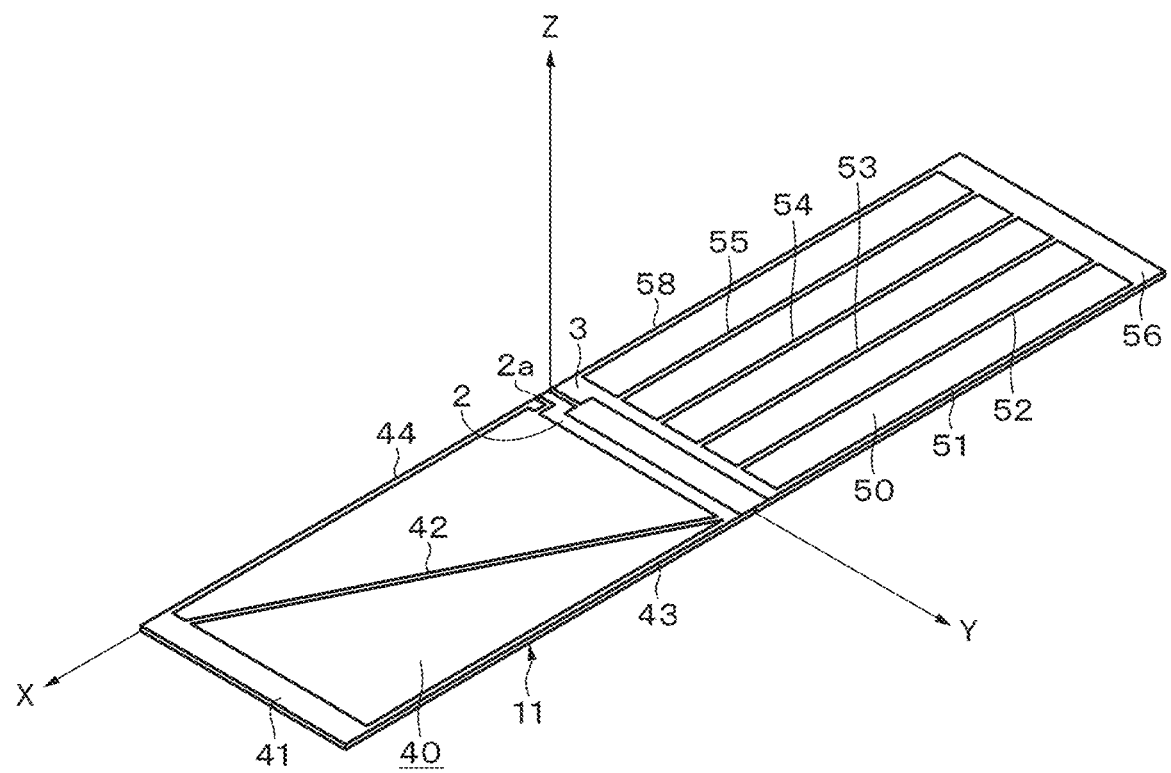
FIG. 10 is a schematic diagram of an antenna device according to a third embodiment of the present technology.

FIG. 10 illustrates a third embodiment of the present technology. An antenna device similar to that of the first embodiment (see FIG. 1) is formed on a printed circuit board 11. A conductive pattern of a connection portion of the line 2 of the balanced transmission line with a coaxial cable is narrowed, and a pattern absence portion 2a is provided. A bent end of a linear element 44 is fixed on the printed circuit board 11 in the pattern absence portion 2a. Portions corresponding to those in FIG. 1 are denoted by the same reference numerals, and detailed descriptions thereof will be omitted. However, in the example of FIG. 10, the number of parallel linear elements of the antenna element 50 on the ground side is greater by one than that of FIG. 1.

When the antenna device is formed on the printed circuit board 11, the required length of the linear element can be shortened by the thickness and the dielectric constant of the printed circuit board 11, and the antenna shape can be formed small. Furthermore, when the antenna device is formed on the substrate, the line shape can be freely formed, and a wide band antenna can be formed by forming a current line corresponding to many frequencies.

Example 3

According to the third embodiment of the present technology, similarly to the first embodiment, broadband can be achieved. Specifically, the length of each linear element is set similarly to Example 1. As an example, (L1=9 cm) (L3=18 cm) (L4=18 cm) are set. The total length is 45 cm. Furthermore, the antenna element 50 is made to have an outer shape equivalent to the antenna element 40. As an example, the length of each of the linear elements 51 to 55 and 58 is set to 18 cm, and the length of the linear element 56 is set to 9 cm. A glass epoxy substrate is used having a thickness of 1 mm, as the printed circuit board 11. The relative dielectric constant of the substrate is about 4. In a case where one having a larger thickness, or having a higher dielectric constant is used as another printed circuit board, the length can be shortened, and downsizing can be achieved.

Figure 11:
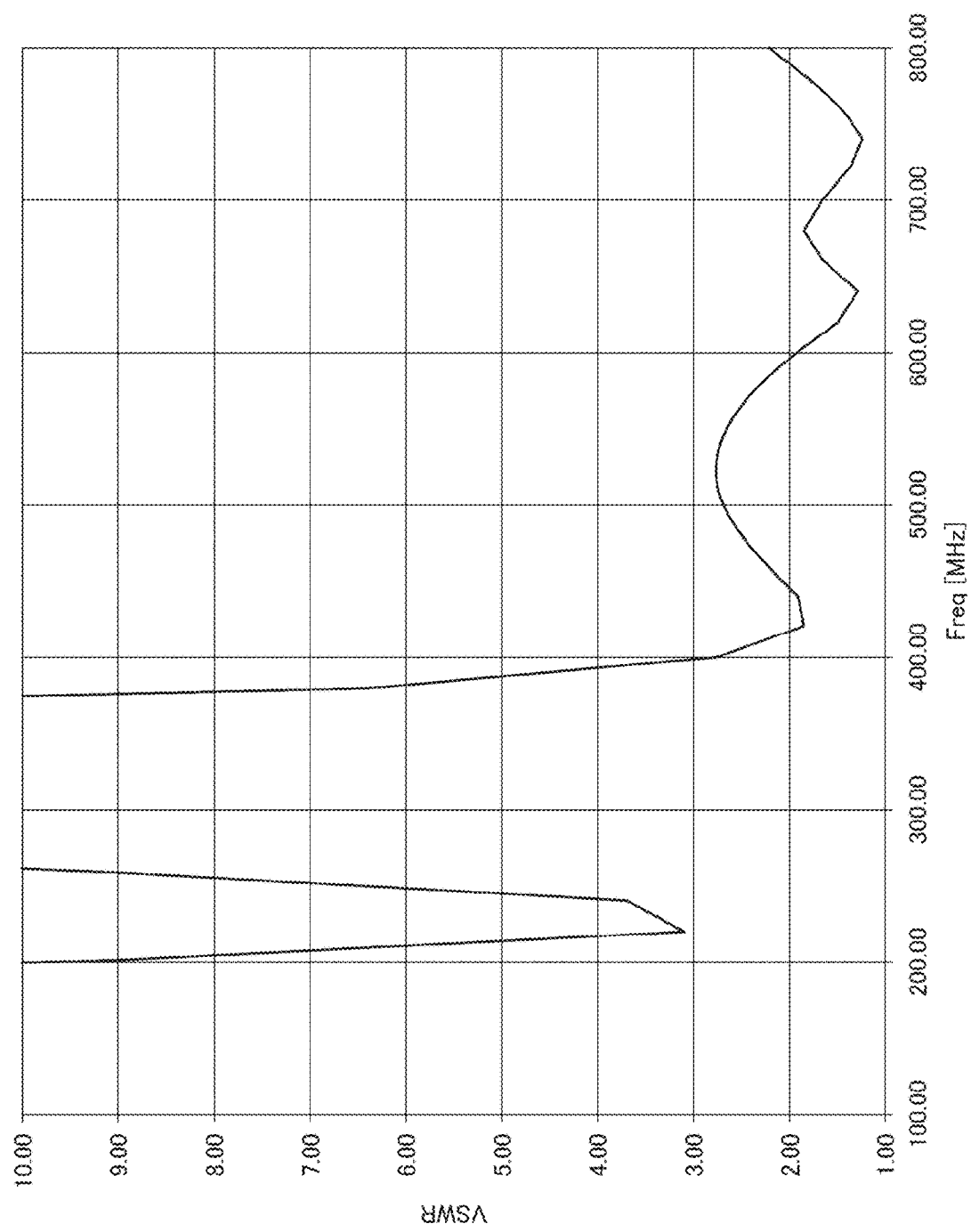
FIG. 11 is a graph illustrating a frequency characteristic of a VSWR of an example of the third embodiment obtained by simulation.

A simulation result (VSWR) of Example 3 is illustrated in FIG. 11. As can be seen from FIG. 11, both the high band of the VHF band and the UHF band can be received. However, strictly speaking, the wavelength shortening rate differs depending on the material, thickness, and the like of the printed circuit board 11, and the characteristics may also be different from those illustrated in FIG. 11.

Figure 12:
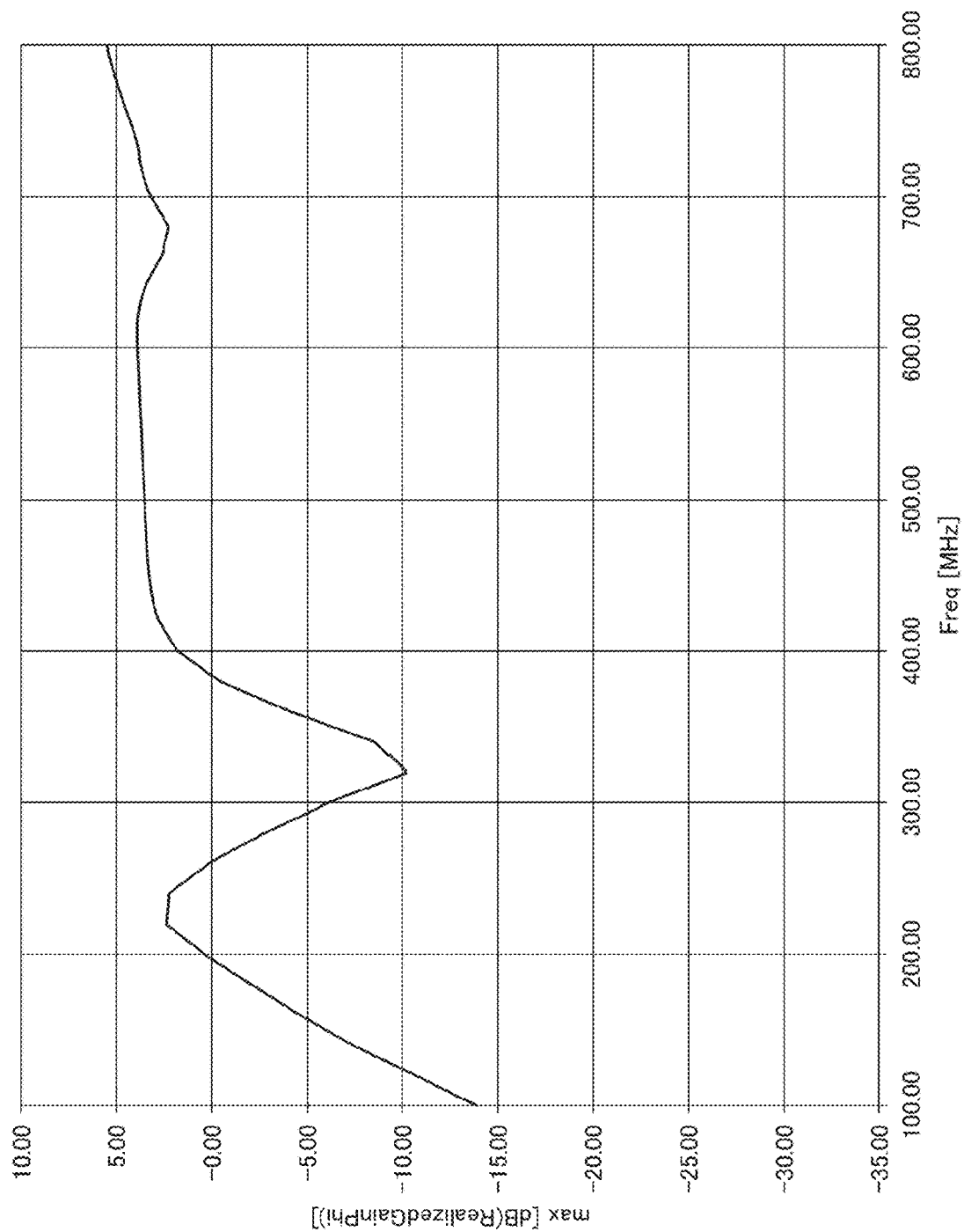
FIG. 12 is a graph illustrating a frequency characteristic of a gain of the third embodiment obtained by simulation.

FIG. 12 is a graph of an antenna gain in the high band of the VHF band, and the UHF band of Example 3. FIG. 12 illustrates, for example, frequency-gain characteristics at the time of horizontal polarization reception. Furthermore, the notation of the vertical axis is dBi. It can also be seen from FIG. 12 that both the high band of the VHF band and the UHF band can be received.

4. Fourth Embodiment

Figure 13:
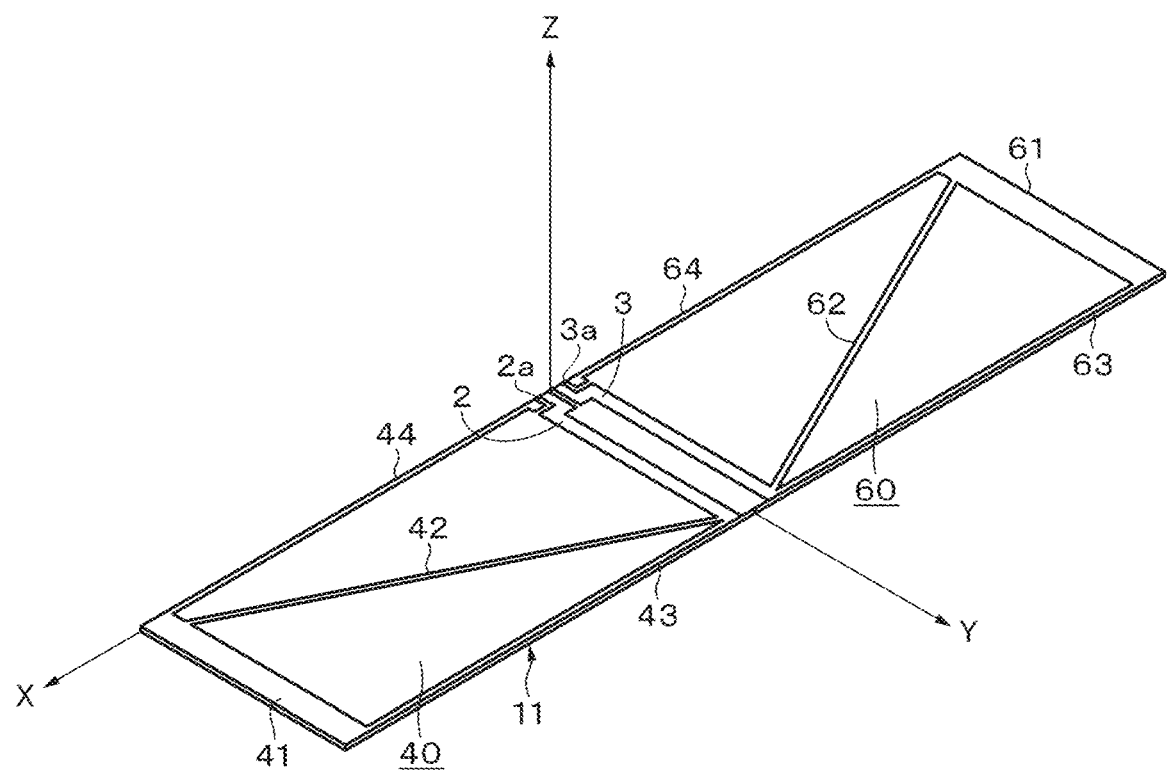
FIG. 13 is a schematic diagram of an antenna device according to a fourth embodiment of the present technology.

FIG. 13 illustrates a fourth embodiment of the present technology. The whole of an antenna device similar to that of the second embodiment (see FIG. 6) is formed on a printed circuit board 11. Conductive patterns of connection portions of the line 2 and the line 3 of the balanced transmission line with the coaxial cable are narrowed, and the pattern absence portions 2a and 3a are provided. Bent ends of respective linear elements 44 and 64 are fixed on the printed circuit board 11 in the pattern absence portions 2a and 3a. Portions corresponding to those in FIG. 3 are denoted by the same reference numerals, and detailed descriptions thereof will be omitted. By forming the antenna device on the printed circuit board 11, there are advantages similar to those of the third embodiment.

Example 4

A glass epoxy substrate is used having a thickness of 1 mm, as the printed circuit board 11. The relative dielectric constant of the substrate is about 4. In a case where one having a larger thickness, or having a higher dielectric constant is used as another printed circuit board, the length can be shortened, and downsizing can be achieved. Furthermore, the length of each linear element is set to (L1=9 cm), and the value of the length L3 (=L4) is changed to 15 cm, 16 cm, 17 cm, and 18 cm.

Figure 14:
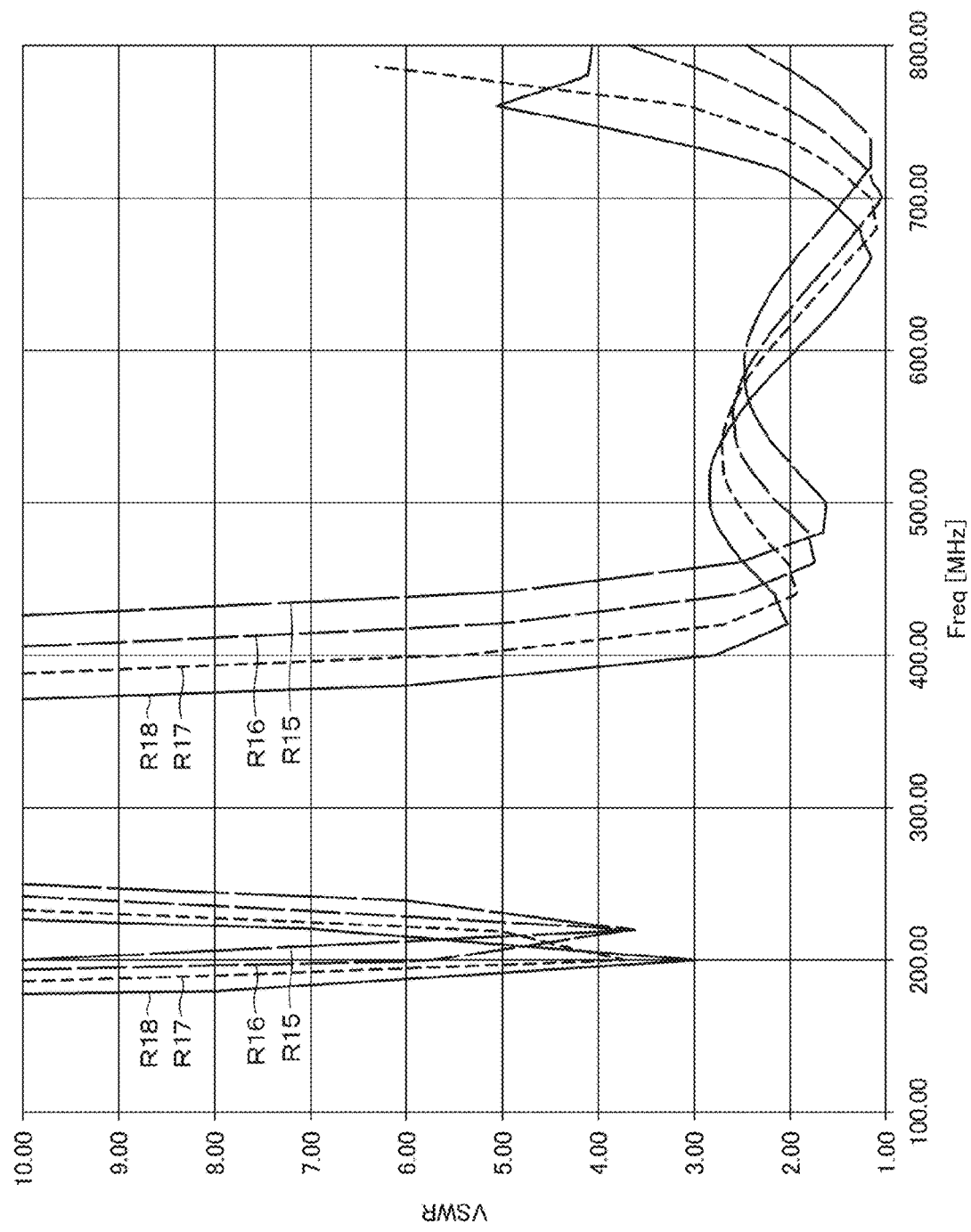
FIG. 14 is a graph illustrating a frequency characteristic of a VSWR of an example of the fourth embodiment obtained by simulation.

A simulation result (VSWR) of Example 4 is illustrated in FIG. 14. In FIG. 14, R15 is a graph in the case of (L3=15 cm), R16 is a graph in the case of (L3=16 cm), R17 is a graph in the case of (L3=17 cm), and R18 is a graph in the case of (L3=18 cm). As can be seen from FIG. 14, both the high band of the VHF band and the band of digital terrestrial television in the UHF band can be received. However, strictly speaking, the wavelength shortening rate differs depending on the material, thickness, and the like of the printed circuit board 11, and the characteristics may also be different from those illustrated in FIG. 14.

Figure 15:
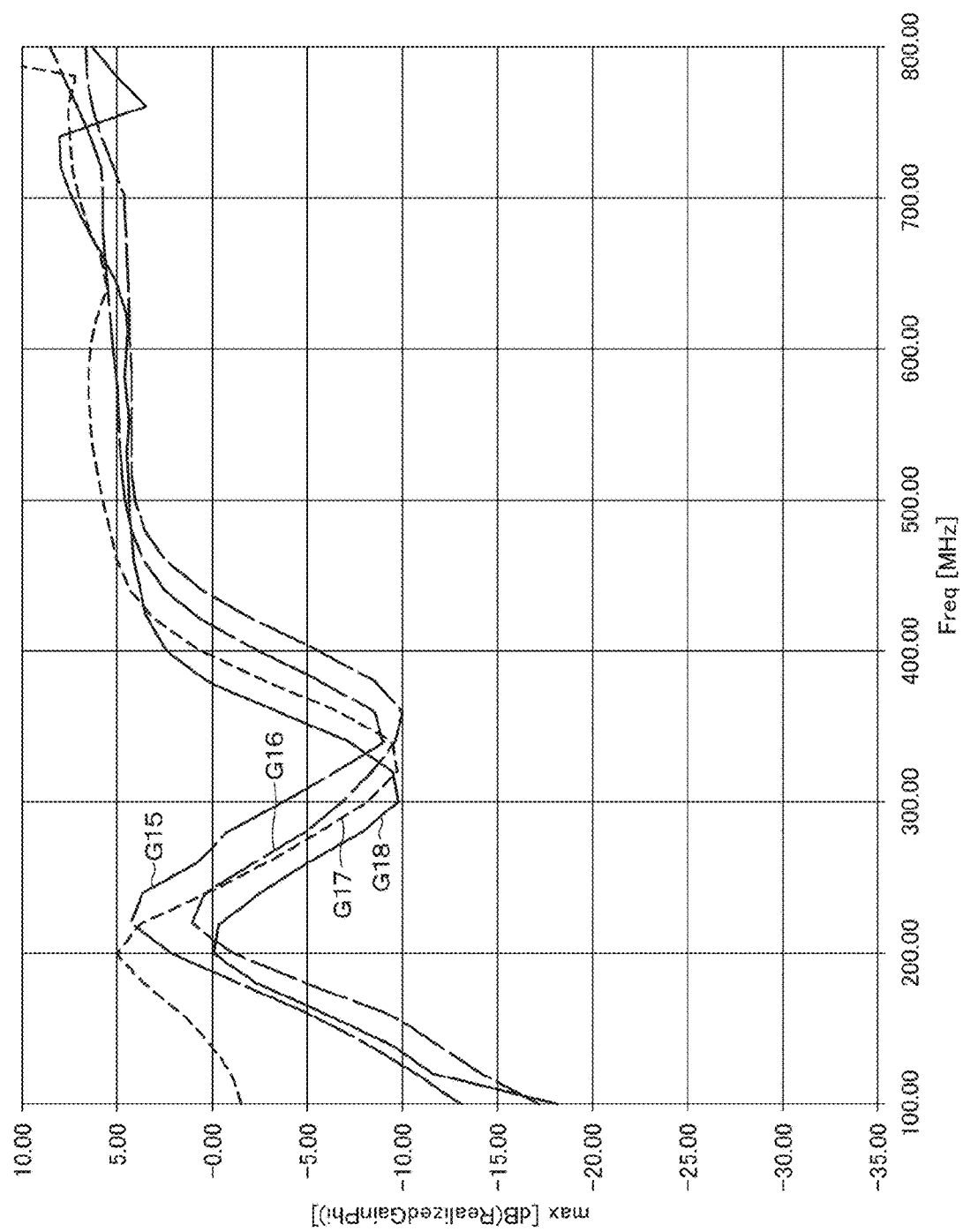
FIG. 15 is a graph illustrating a frequency characteristic of a gain of the fourth embodiment obtained by simulation.

FIG. 15 is a graph of an antenna gain in the high band of the VHF band, and the band of digital terrestrial television in the UHF band of Example 4. FIG. 15 illustrates, for example, frequency-gain characteristics at the time of horizontal polarization reception. G15 is a graph in the case of (L3=15 cm), G16 is a graph in the case of (L3=16 cm), G17 is a graph in the case of (L3=17 cm), and G18 is a graph in the case of (L3=18 cm). Furthermore, the notation of the vertical axis is dBi. It can also be seen from FIG. 15 that both the high band of the VHF band and the UHF band can be received.

5. Fifth Embodiment

Figure 16:
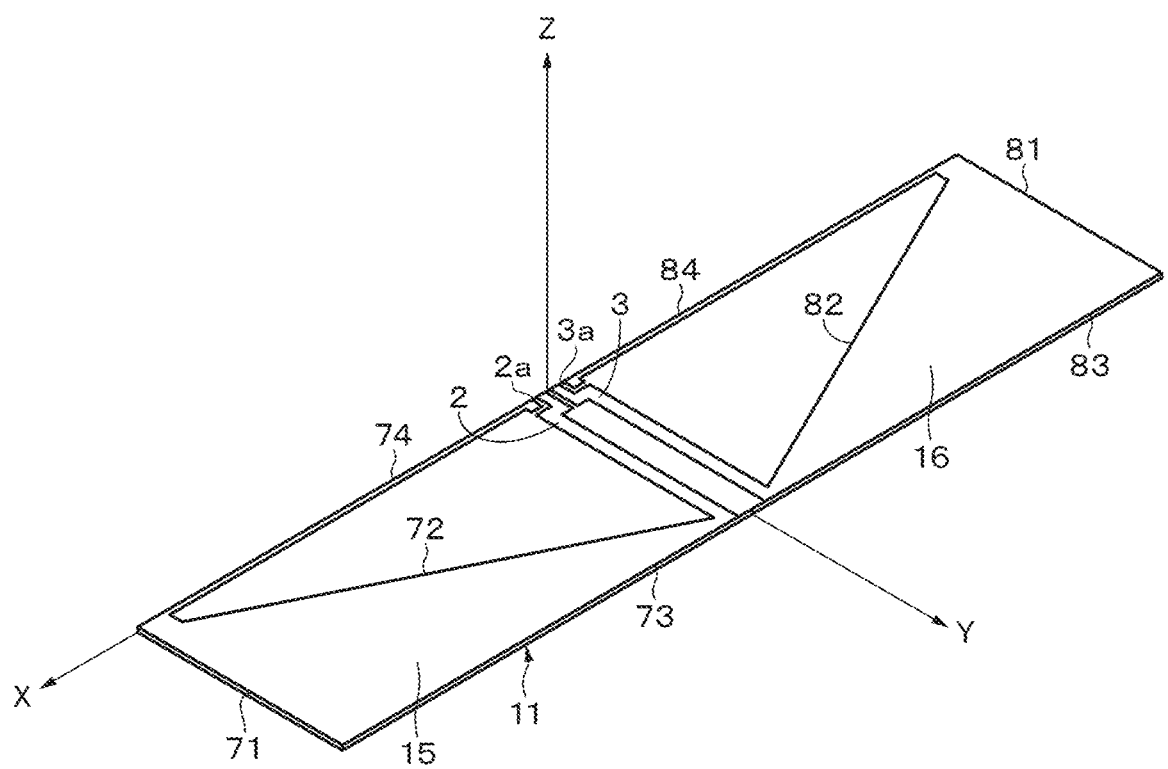
FIG. 16 is a schematic diagram of an antenna device according to a fifth embodiment of the present technology.

FIG. 16 illustrates a fifth embodiment of the present technology. The triangular antenna elements in the second embodiment (see FIG. 6) are formed on a printed circuit board 11 as a surface 15 and a surface 16 each having a right triangular shape. The surfaces may be formed as an insulating plate without being formed on the printed circuit board 11. In the fifth embodiment, the surface 15 is made to have a right triangular shape including sides 71, 72, and 73, and the surface 16 is made to have a right triangular shape including sides 81, 82, and 83.

Moreover, linear elements 74 and 84 are formed on the printed circuit board 11 respectively corresponding to the linear elements 44 and 64. Also by forming the antenna element with such a surface, a wide band antenna device can be implemented similarly to the second embodiment. Furthermore, by forming a flat plate, a current line corresponding to many frequencies can be formed, and a wide band antenna can be formed.

Example 5

A glass epoxy substrate is used having a thickness of 1 mm, as the printed circuit board 11. The relative dielectric constant of the substrate is about 4. In a case where one having a larger thickness, or having a higher dielectric constant is used as another printed circuit board, the length can be shortened, and downsizing can be achieved. The lengths of the sides 71 and 81 are set to (L1=9 cm), and furthermore, values of a lengths L3 (=L4) of the sides 73 and 83 are set to 18 cm.

Figure 17:
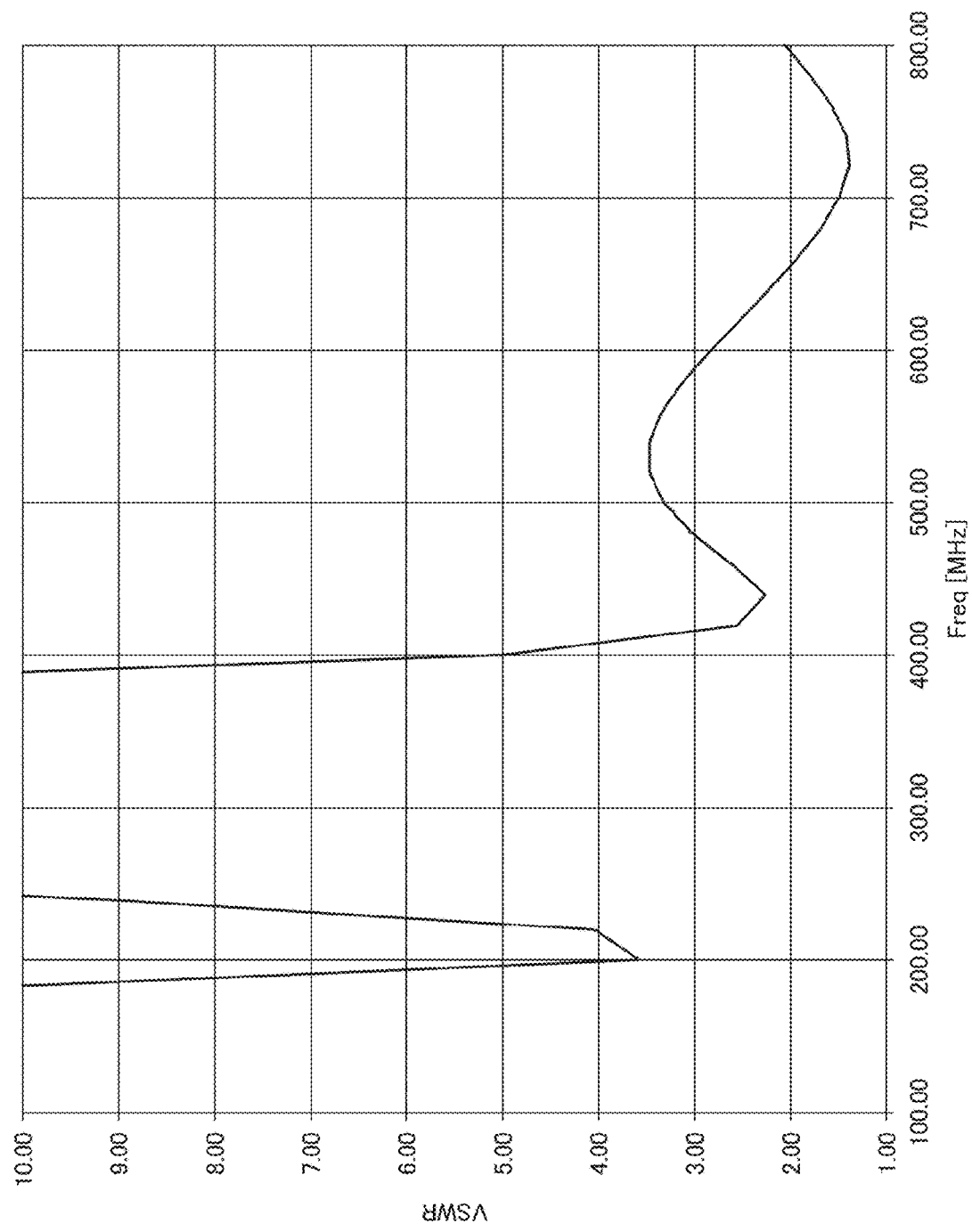
FIG. 17 is a graph illustrating a frequency characteristic of a VSWR of an example of the fifth embodiment obtained by simulation.

A simulation result (VSWR) of Example 5 is illustrated in FIG. 17. As can be seen from FIG. 17, both the high band of the VHF band and the UHF band can be received. However, strictly speaking, the wavelength shortening rate differs depending on the material, thickness, and the like of the printed circuit board 11, and the characteristics may also be different from those illustrated in FIG. 17.

Figure 18:
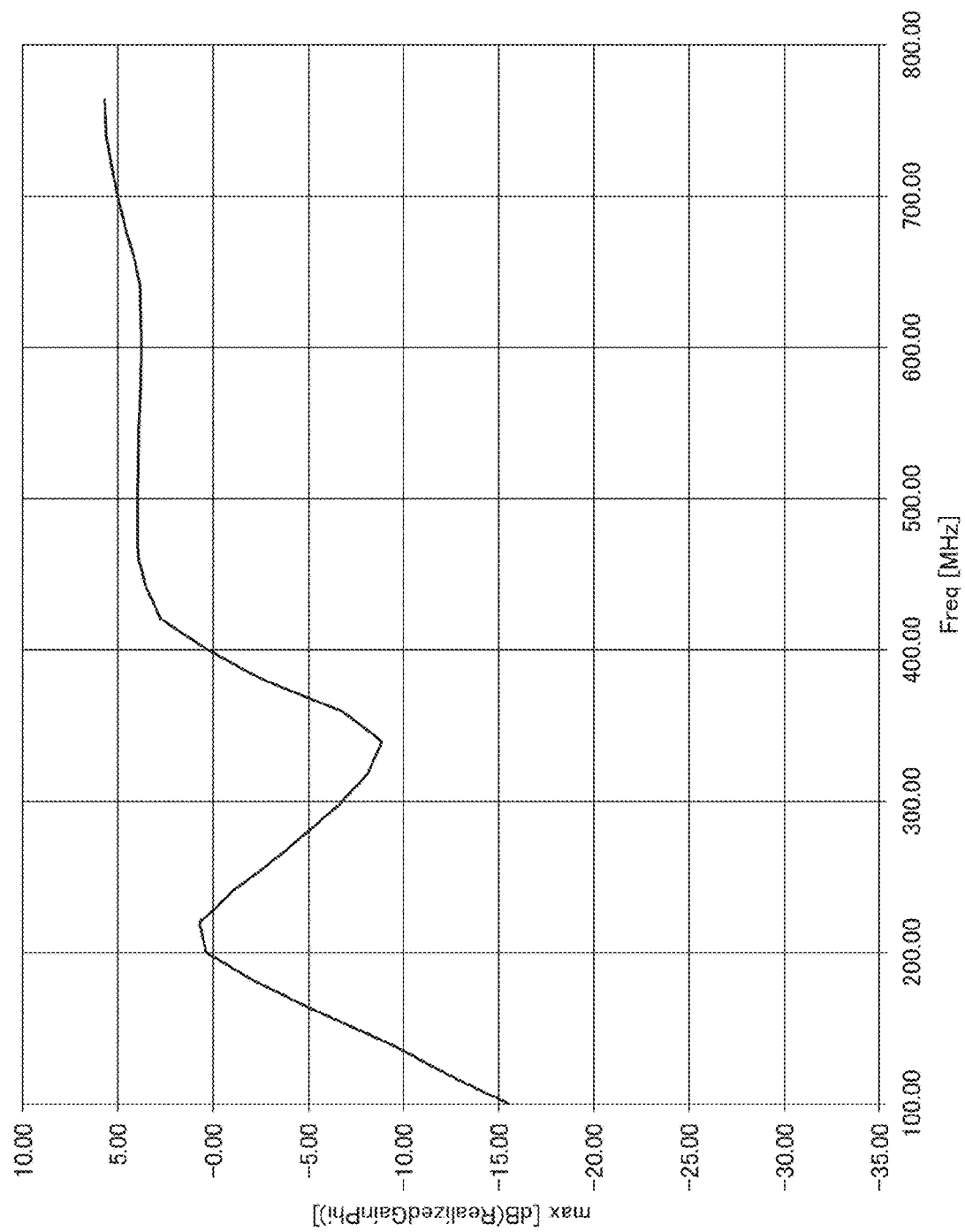
FIG. 18 is a graph illustrating a frequency characteristic of a gain of the fifth embodiment obtained by simulation.

FIG. 18 is a graph of an antenna gain in the high band of the VHF band, and the UHF band of Example 5. FIG. 18 illustrates, for example, frequency-gain characteristics at the time of horizontal polarization reception. The notation of the vertical axis of the graph is dBi. It can also be seen from FIG. 18 that both the high band of the VHF band and the UHF band can be received.

6. Sixth Embodiment

Figure 19:
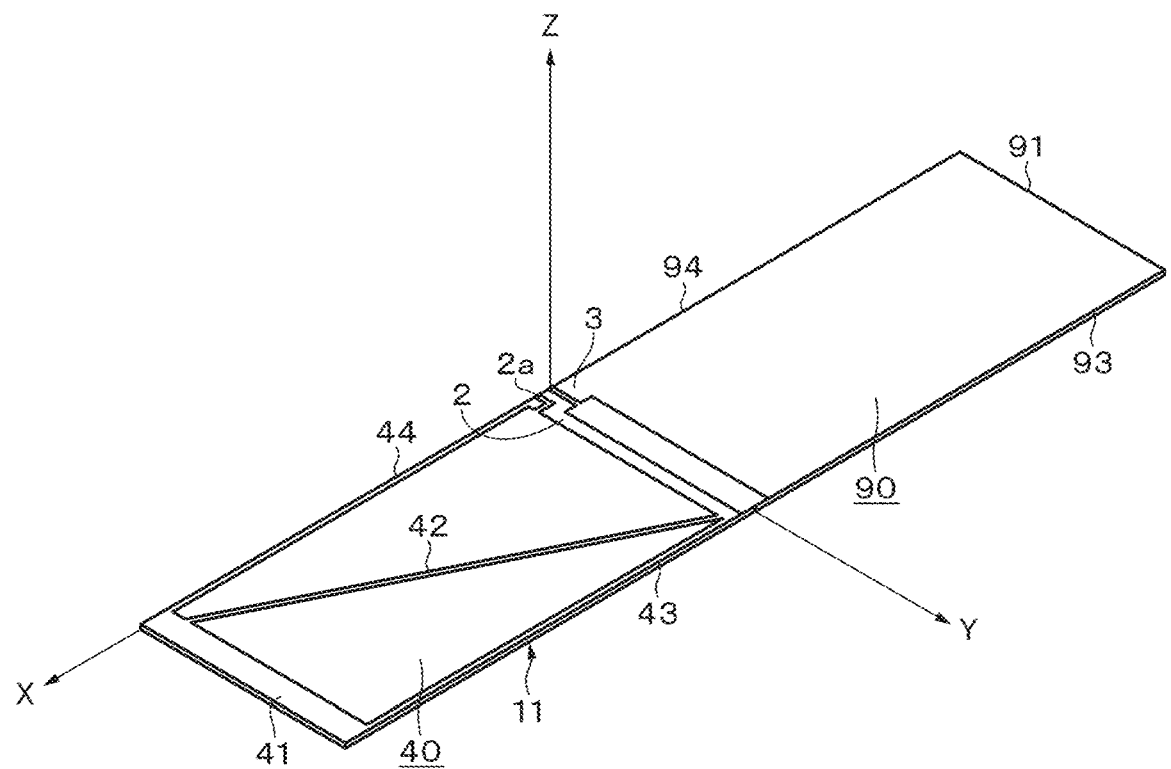
FIG. 19 is a schematic diagram of an antenna device according to a sixth embodiment of the present technology.

FIG. 19 illustrates a sixth embodiment of the present technology. A triangular antenna element 40 is similar to the antenna element in the first embodiment (see FIG. 1), and includes linear elements 41 to 44. The antenna element 50 in the first embodiment is formed as a rectangular surface 90. The rectangular surface 90 includes sides 91, 93, and 94. The whole of the antenna element 40 and the rectangular surface 90 is formed on a common printed circuit board 11.

Example 6

A glass epoxy substrate is used having a thickness of 1 mm, as the printed circuit board 11. The relative dielectric constant of the substrate is about 4. In a case where one having a larger thickness, or having a higher dielectric constant is used as another printed circuit board, the length can be shortened, and downsizing can be achieved. The lengths of the linear element 41, and the side 91 parallel to the linear element 41 of the rectangular surface 90 are set to (L1=9 cm), and furthermore, a value of a length L3 (=L4) of each of the linear element 43 and the side 93 (side 94) is set to 18 cm.

Figure 20:
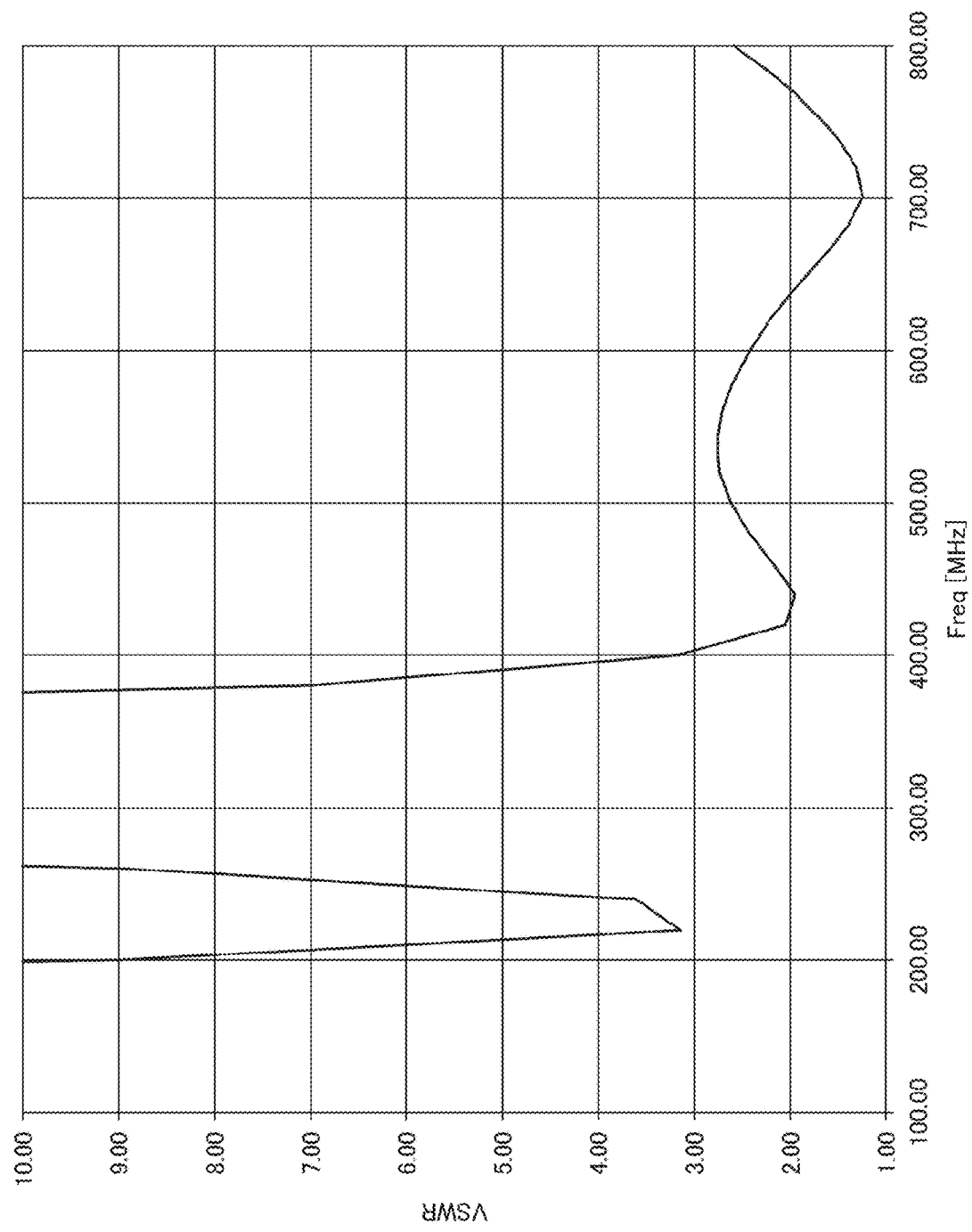
FIG. 20 is a graph illustrating a frequency characteristic of a VSWR of an example of the sixth embodiment obtained by simulation.

A simulation result (VSWR) of Example 6 is illustrated in FIG. 20. As can be seen from FIG. 20, both the high band of the VHF band and the UHF band can be received. However, strictly speaking, the wavelength shortening rate differs depending on the material, thickness, and the like of the printed circuit board 11, and the characteristics may also be different from those illustrated in FIG. 20.

Figure 21:
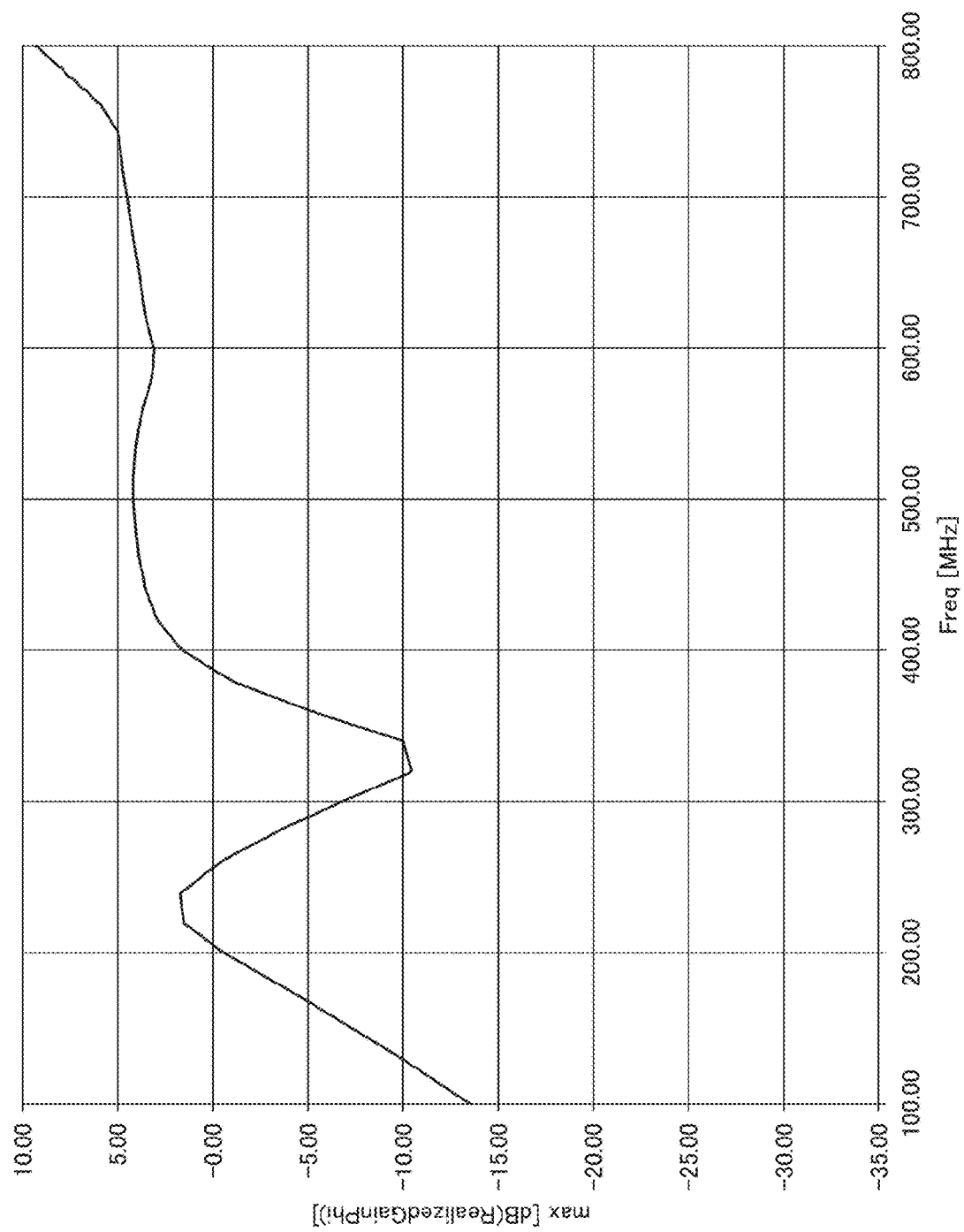
FIG. 21 is a graph illustrating a frequency characteristic of a gain of the sixth embodiment obtained by simulation.

FIG. 21 is a graph of an antenna gain in the high band of the VHF band, and the UHF band of Example 6. FIG. 21 illustrates, for example, frequency-gain characteristics at the time of horizontal polarization reception. The notation of the vertical axis of the graph is dBi. It can also be seen from FIG. 21 that both the high band of the VHF band and the UHF band can be received.

7. Seventh Embodiment

Figure 22:
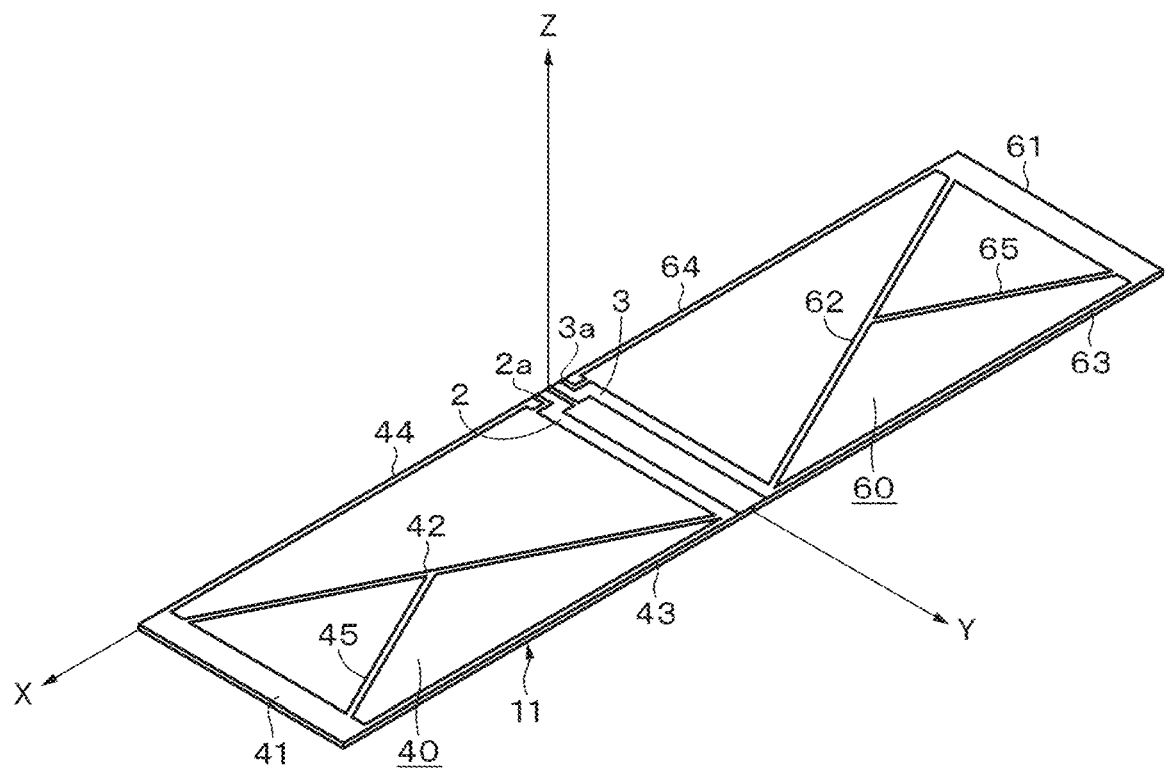
FIG. 22 is a schematic diagram of an antenna device according to a seventh embodiment of the present technology.

FIG. 22 illustrates a seventh embodiment of the present technology. The whole of an antenna device similar to that of the fourth embodiment (see FIG. 13) is formed on a printed circuit board 11, and moreover, a linear element 45 and a linear element 65 are added. The linear element 45 is formed that connects a connection point between linear elements 41 and 43 (a right-angled portion of a right triangular shape) and the vicinity of the intermediate position of a linear element 42. Similarly, the linear element 65 is formed that connects a connection point between linear elements 61 and 63 (a right-angled portion of a right triangular shape) and the vicinity of the intermediate position of a linear element 62. Portions corresponding to those in FIG. 13 are denoted by the same reference numerals, and detailed descriptions thereof will be omitted. By forming the antenna device on the printed circuit board 11, there are advantages similar to those of the fourth embodiment.

Example 7

A glass epoxy substrate is used having a thickness of 1 mm, as the printed circuit board 11. The relative dielectric constant of the substrate is about 4. In a case where one having a larger thickness, or having a higher dielectric constant is used as another printed circuit board, the length can be shortened, and downsizing can be achieved. The lengths of the linear elements 41 and 61 are set to (L1=9 cm), and furthermore, a value of a length L3 (=L4) of each of the linear elements 43 and 63 (linear elements 44 and 64) is set to 18 cm.

Figure 23:
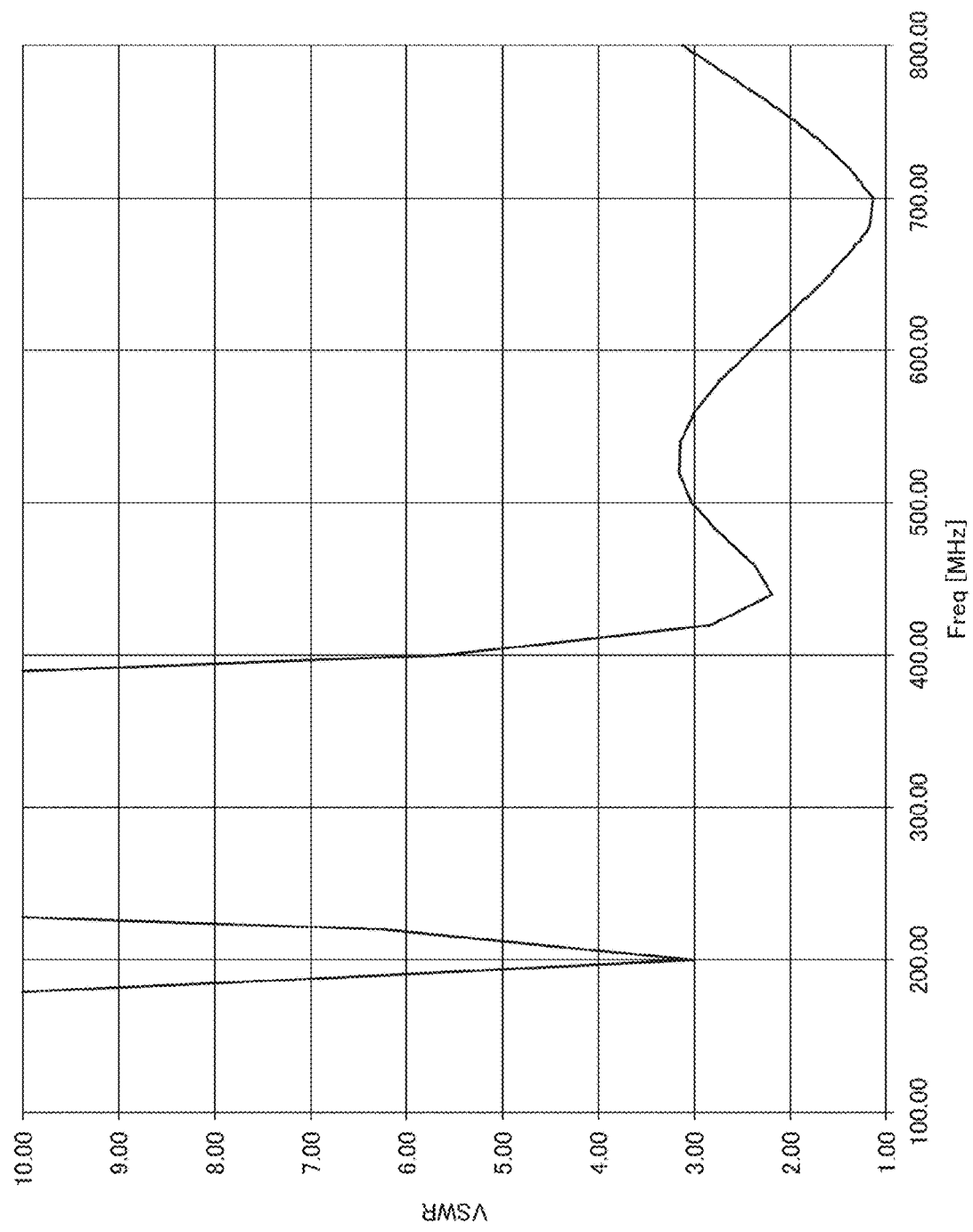
FIG. 23 is a graph illustrating a frequency characteristic of a VSWR of an example of the seventh embodiment obtained by simulation.

A simulation result (VSWR) of Example 7 is illustrated in FIG. 23. As can be seen from FIG. 23, both the high band of the VHF band and the UHF band can be received. However, strictly speaking, the wavelength shortening rate differs depending on the material, thickness, and the like of the printed circuit board 11, and the characteristics may also be different from those illustrated in FIG. 23.

Figure 24:
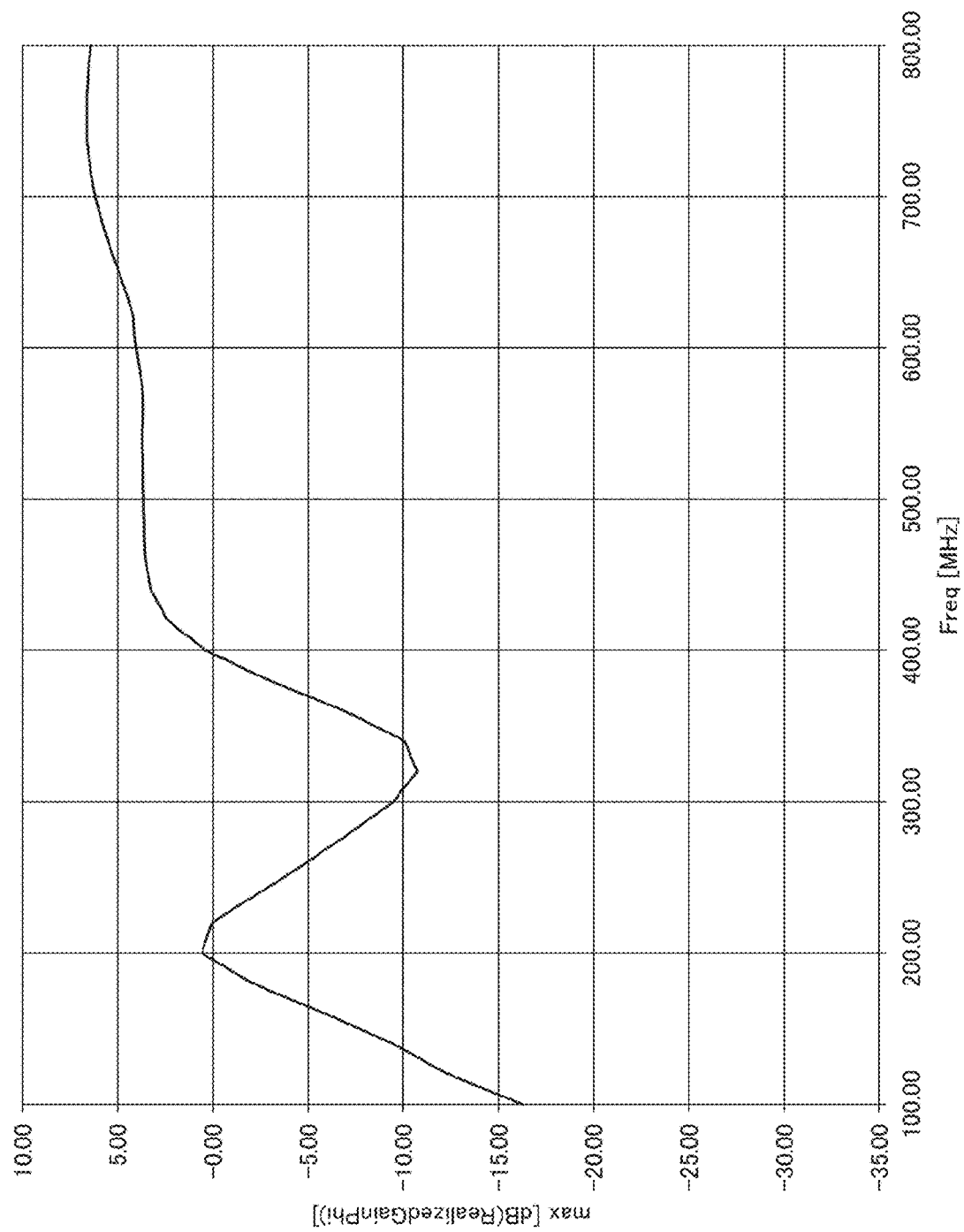
FIG. 24 is a graph illustrating a frequency characteristic of a gain of the seventh embodiment obtained by simulation.

FIG. 24 is a graph of an antenna gain in the high band of the VHF band, and the band of digital terrestrial television broadcasting in the UHF band of Example 7. FIG. 24 illustrates, for example, frequency-gain characteristics at the time of horizontal polarization reception. The notation of the vertical axis of the graph is dBi. It can also be seen from FIG. 24 that both the high band of the VHF band and the UHF band can be received. Furthermore, by adding the linear elements 45 and 65, a current line can be formed corresponding to many frequencies, and a wide band antenna can be formed.

8. Modification

Figure 25:
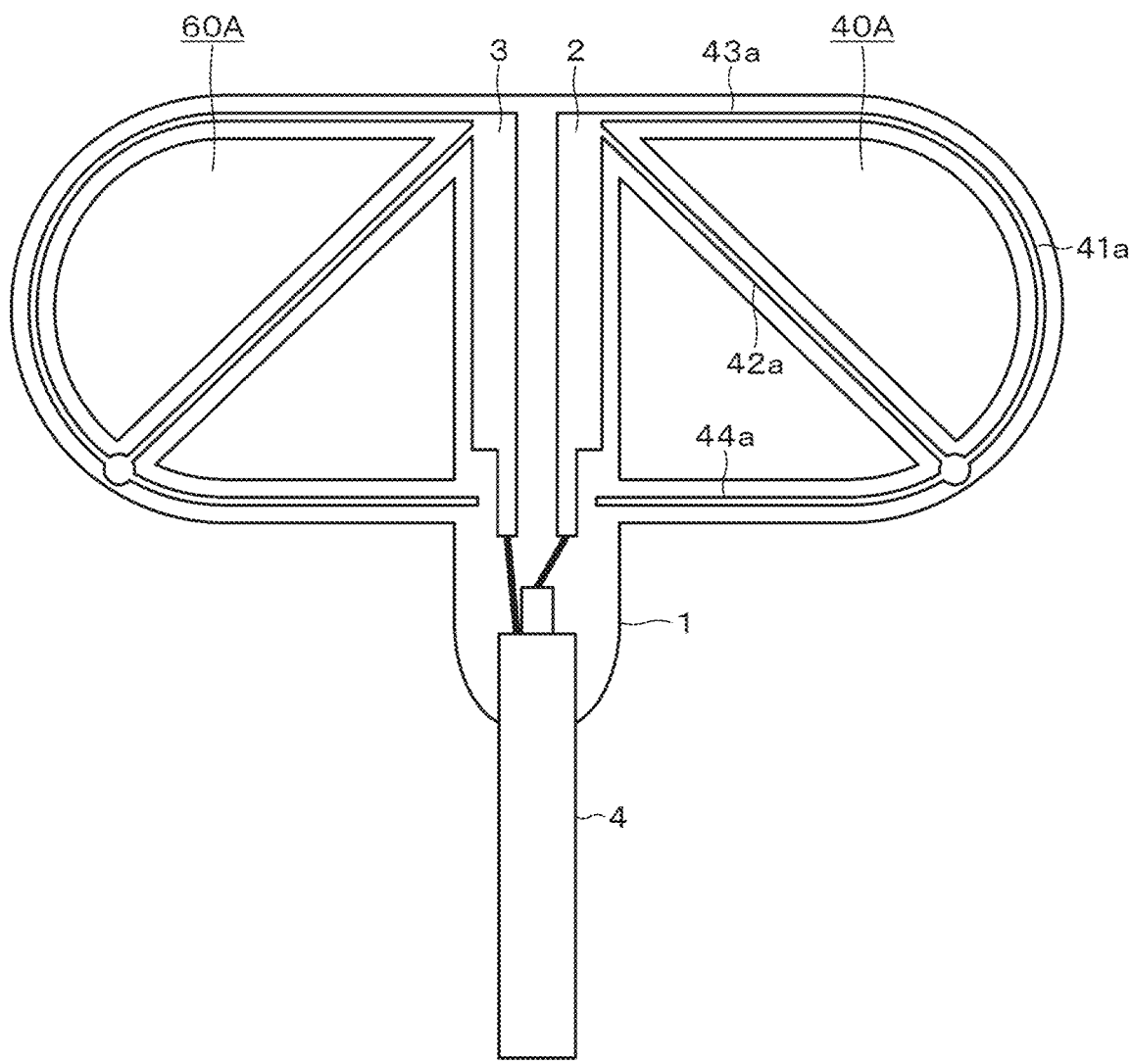
FIG. 25 is a schematic diagram used for describing a modification of the present technology.
Figure 26:
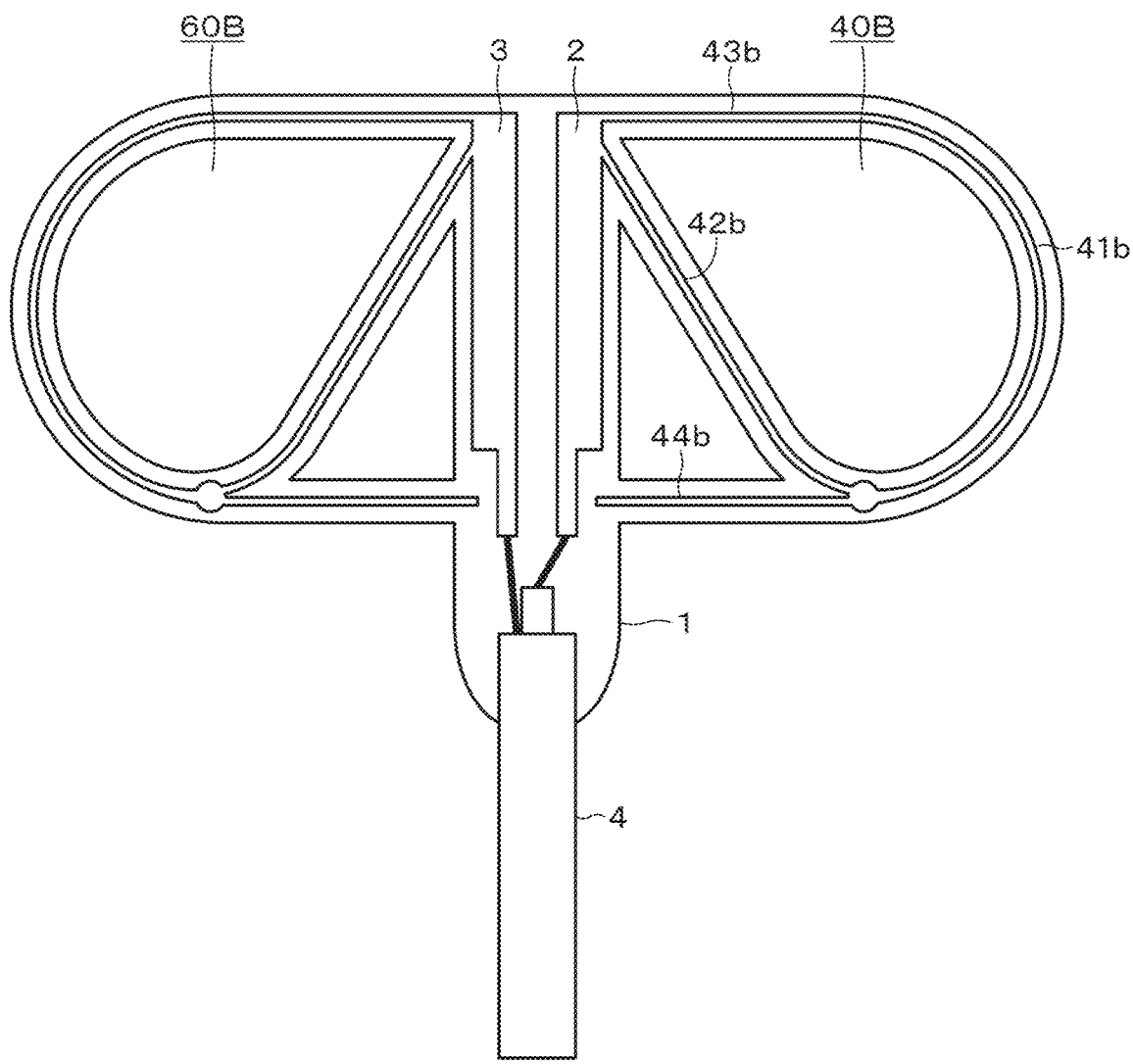
FIG. 26 is a schematic diagram used for describing a modification of the present technology.

In the embodiments described above, the triangular antenna element forms a right triangular shape, but the shape is not limited to the right triangular shape. For example, in an example in which antenna elements 40A and 60A are respectively provided on both sides similarly to the second embodiment, as illustrated in FIG. 25, a linear element 43a and a linear element 41a may be formed by a continuous wire to cause the linear element 41a to form an arc. In this case, the shape is closer to a trapezoidal shape than a right triangular shape. The other antenna element 60A has a similar shape. Furthermore, as illustrated in FIG. 26, a linear element 41b may be formed to draw a semicircular shape protruding outward.

Figure 27:
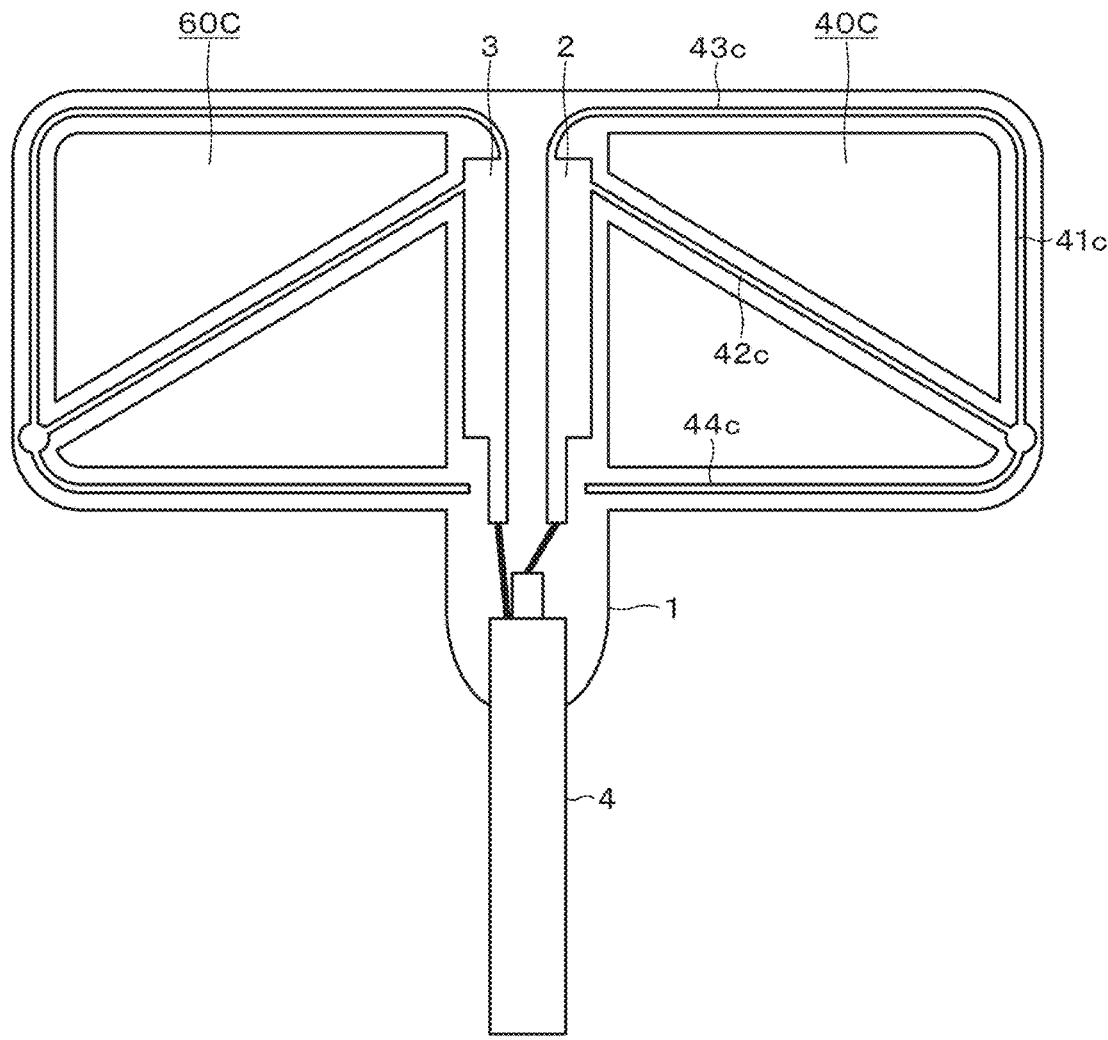
FIG. 27 is a schematic diagram used for describing a modification of the present technology.

Moreover, as illustrated in FIG. 27, in one antenna element 40C, linear elements 41c and 43c may be formed by a continuous wire to cause a protruding tip to draw a curve of a certain curvature radius, not a right angle. Another antenna element 60C is similar. In the examples respectively illustrated in FIGS. 25, 26, and 27, each of the linear elements is formed on a strip-like printed circuit board or insulating plate formed having a predetermined width along the shape of the linear elements. By increasing the strength of the printed circuit board or the insulating plate, the antenna device can be made to stand by itself.

The embodiments of the present technology have been specifically described above; however, the present technology is not limited to the embodiments described above, and various modifications can be made based on the technical idea of the present technology. For example, the present technology can be applied to not only a reception antenna of television broadcasting, but also to an antenna device for a mobile phone, an antenna device for a wireless LAN, and the like. Furthermore, the configurations, methods, processes, shapes, materials, numerical values, and the like in the embodiments described above are merely examples, and different configurations, methods, processes, shapes, materials, numerical values, and the like may be used as necessary.

9. Application Example

Figure 28:
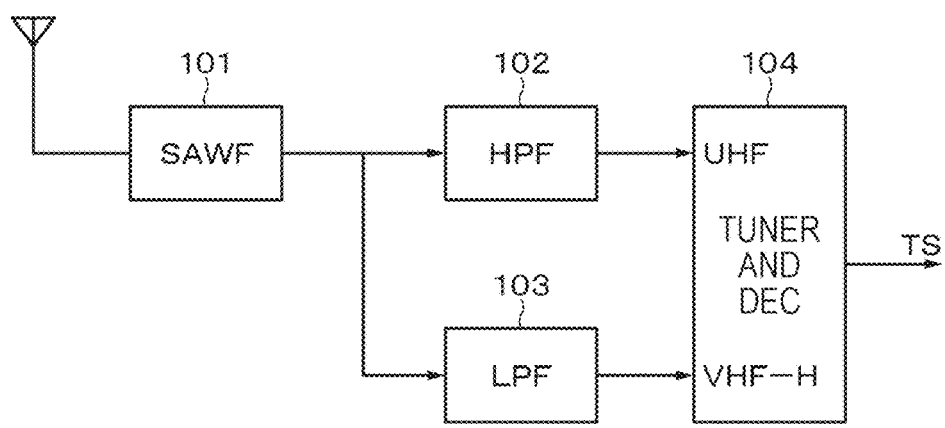
FIG. 28 is a block diagram used for describing an application example of the present technology.

As illustrated in FIG. 28, for example, in the case of using a combination of two tuners such as a digital radio and television tuner using the VHF band and a television tuner receiving the UHF band, an output of an indoor television antenna according to the present technology is supplied to a surface acoustic wave filter (SAWF) 101 via a coaxial cable, a connector, and a low noise amplifier (LNA) (not illustrated). The surface acoustic wave filter 101 is for removing unnecessary signal components. An output of the surface acoustic wave filter 101 is supplied to a high pass filter 102 and a low pass filter 103. An output of the high pass filter 102 is supplied to a UHF input of a tuner and decoder 104, and an output of the low pass filter 103 is supplied to a VHF-H (VHF band high band) input of the tuner and decoder 104.

The tuner and decoder 104 performs frequency conversion of an input signal of each band into an intermediate frequency signal. The intermediate frequency signal is supplied to a decoder, and a transport stream (TS) is demodulated by the decoder. Although not illustrated, the transport stream is decoded, and a video signal and an audio signal are obtained. A switching signal (not illustrated) is supplied to the tuner and decoder 104 in response to user operation or the like, and a transport stream of one of bands of the UHF input and the VHF-H is selectively output corresponding to the switching signal. Note that, the present technology can also be used as an antenna device in the case of a reception device that receives both a VHF band television reception device and a UHF band television reception device.

Note that, the present technology can also be configured as described below.

(1)

An antenna device made to perform impedance matching and phase adjustment by connecting an unbalanced circuit to a power feeding point via a balanced circuit of a certain length.

(2)

An antenna device including:

a balanced transmission line to which an unbalanced transmission line is connected at one end; and antenna elements respectively provided on both sides of the balanced transmission line, in which at least one of the antenna elements, in a case where a first point and a second point are set, the first point being separated from a position on one end side of the balanced transmission line in a direction substantially orthogonal to the balanced transmission line, the second point being separated from a position on another end side of the balanced transmission line in a direction substantially orthogonal to the balanced transmission line, has a shape including the second point and an oblique line or side connecting the other end side of the balanced transmission line with the first point, the other end side of the balanced transmission line is connected to a vertex portion of the antenna element, a linear element is provided extending from a position of the first point of the antenna element toward the one end side of the balanced transmission line, and the antenna element and the linear element include a conductor.

(3)

The antenna device according to (2), in which the shape including the second point and the oblique line or side is triangular.

(4)

The antenna device according to (3), in which the antenna element having the triangular shape includes a surface or a line.

(5)

The antenna device according to (3), in which some of lines or sides of the antenna element having the triangular shape include a curve.

(6)

The antenna device according to (3), in which a protruding tip of the antenna element having the triangular shape includes a curve.

(7)

The antenna device according to any of (3) to (6), in which lengths of lines or sides of the element having the triangular shape, including a wavelength shortening rate, is set depending on a frequency desired to be received.

(8)

The antenna device according to any of (3) to (7), in which a sum of lengths of lines or sides of the element having the triangular shape and a length of the linear element, or a sum of a length of the oblique line or side and the length of the linear element, including a wavelength shortening rate, is set to a length of approximately $\lambda/4$ of a first frequency desired to be received, and the length of the linear element, including a wavelength shortening rate, is set to a length of approximately $\lambda/4$ of a second frequency desired to be received.

(9)

The antenna device according to any of (2) to (8), in which another antenna element provided on one side of the balanced transmission line has a shape identical to the shape of the antenna element according to (2).

(10)

The antenna device according to (9), in which the other antenna element includes a polygonal or circular conductive surface.

(11)

The antenna device according to (9), in which the other antenna element includes a linear element.

(12)

An antenna device including:

a balanced transmission line to which an unbalanced transmission line is connected at one end; and antenna elements respectively provided on both sides of the balanced transmission line, in which at least one of the antenna elements, in a case where a first point and a second point are set, the first point being separated from a position on one end side of the balanced transmission line in a direction substantially orthogonal to the balanced transmission line, the second point being separated from a position on another end side of the balanced transmission line in a direction substantially orthogonal to the balanced transmission line, has a shape including the second point and an oblique line or side connecting the other end side of the balanced transmission line with the first point, the other end side of the balanced transmission line is connected to a vertex portion of the antenna element, a linear element is provided extending from a position of the first point of the antenna element toward the one end side of the balanced transmission line, the antenna element and the linear element include a conductor, and the antenna element having the shape including the second point and the oblique line or side is formed on an insulating plate.

(13)

A reception device including:

a reception antenna; and a demodulation unit that amplifies and demodulates a high frequency signal from the reception antenna, in which the reception antenna has a configuration according to any of (2) to (11).

REFERENCE SIGNS LIST

1 Insulating substrate
2 One line of balanced transmission line
3 Another line of balanced transmission line
4 Coaxial cable
5 Insulating substrate
11 Printed circuit board
40, 50, 60, Antenna element

The invention claimed is:

1. An antenna device comprising:
a balanced transmission line to which a coaxial cable is connected at one end; and
antenna elements respectively provided on both sides of the balanced transmission line, wherein
at least one of the antenna elements, where a first point and a second point are set, the first point being separated from a position on one end portion of the balanced transmission line in a direction substantially orthogonal to the balanced transmission line, the second point being separated from a position on another end portion of the balanced transmission line in a direction substantially orthogonal to the balanced transmission line, has a triangular shape including a line connecting with the another end portion of the balanced transmission line and the second point, and an oblique line connecting with the another end portion of the balanced transmission line and the first point, the another end portion of the balanced transmission line is connected to a vertex portion of the antenna element,
a linear element is provided extending from a position of the first point of the antenna element toward the one end portion of the balanced transmission line,
the linear element is not connected to the balanced transmission line electrically, and
the antenna element and the linear element include a conductor.

2. The antenna device according to claim 1, wherein the shape including the second point and the oblique line or side is triangular.

3. The antenna device according to claim 2, wherein the antenna element having the triangular shape includes a surface or a line.

4. The antenna device according to claim 2, wherein some of lines or sides of the antenna element having the triangular shape include a curve.

5. The antenna device according to claim 2, wherein a protruding tip of the antenna element having the triangular shape includes a curve.

6. The antenna device according to claim 2, wherein lengths of lines or sides of the element having the triangular shape, including a wavelength shortening rate, is set depending on a frequency desired to be received.

7. The antenna device according to claim 1, wherein
one end on a line side of the linear element is not connected to a line of the balanced transmission line.

8. The antenna device according to claim 1, wherein another antenna element provided on one side of the balanced transmission line has a shape identical to the shape of the antenna element according to claim 1.

9. The antenna device according to claim 8, wherein the other antenna element includes a polygonal or circular conductive surface.

10. The antenna device according to claim 8, wherein the other antenna element includes a linear element.

11. A reception device comprising:
a demodulation unit that amplifies and demodulates a high frequency signal from an antenna device,
wherein the antenna device has a configuration according to claim 1.

* * * * *